US012786494B2

(12) United States Patent
Fuhrer et al.

(10) Patent No.: US 12,786,494 B2
(45) **Date of Patent: *Nov. 3, 2026**

(54) METHODS, APPARATUS, AND ARTICLES OF MANUFACTURE TO DETERMINE PENETRATION AND CHURN OF STREAMING SERVICES

(71) Applicant: The Nielsen Company (US), LLC, New York, NY (US)

(72) Inventors: Brian Fuhrer, Crystal Beach, FL (US); Albert T. Borawski, Knoxville, TN (US); Kevin J. Rini, Tampa, FL (US); Jill J. Jones, Palm Harbor, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/023,079

(22) Filed: Jan. 15, 2025

(65) Prior Publication Data

US 2025/0168433 A1 May 22, 2025

Related U.S. Application Data

(63) Continuation of application No. 18/596,430, filed on Mar. 5, 2024, now Pat. No. 12,273,575, which is a continuation of application No. 17/965,523, filed on Oct. 13, 2022, now Pat. No. 11,968,415.

(51) Int. Cl.

| | |
|---|---|
| ***H04N 21/25*** | (2011.01) |
| ***G06Q 30/0201*** | (2023.01) |
| ***H04N 21/24*** | (2011.01) |

(52) U.S. Cl.

CPC ....... *H04N 21/252* (2013.01); *G06Q 30/0201* (2013.01); *H04N 21/2407* (2013.01)

(58) Field of Classification Search

CPC ............. H04N 21/252; H04N 21/2407; G06Q 30/0201

See application file for complete search history.

(56) References Cited

U.S. PATENT DOCUMENTS

2010/0043014 A1* 2/2010 Hebeler, Jr. ............. H04W 4/24 719/315

2014/0026158 A1* 1/2014 Rowe ............... H04N 21/42218 725/18

* cited by examiner

*Primary Examiner* — Nnenna N Ekpo

(57) ABSTRACT

Methods, apparatus, systems, and articles of manufacture are disclosed that determine a penetration and a churn of a streaming service. Example apparatus disclosed herein includes processor circuitry to instantiate at least interval determination circuitry to determine an interval between the first tuning event and the second tuning event, the first and second tuning events corresponding to streaming of media in a first household using the streaming service via a media device, characterization circuitry to characterize a status of the first household as subscribed when the interval satisfies a threshold, aggregation circuitry to aggregate statuses of households over a time period, the households including the first household, and penetration determination circuitry to generate first analytical data based on a number of subscribed statuses per a total number of households at a timestamp, the timestamp within the time period.

20 Claims, 10 Drawing Sheets

METHODS, APPARATUS, AND ARTICLES OF MANUFACTURE TO DETERMINE PENETRATION AND CHURN OF STREAMING SERVICES

CROSS REFERENCE TO RELATED APPLICATIONS

This application is a continuation of U.S. patent application Ser. No. 18/596,430 (now issued U.S. Pat. No. 12,273,575), filed Mar. 5, 2024, which is a continuation of U.S. Pat. No. 17,965,523 (now issued U.S. Pat. No. 11,968,415), filed Oct. 13, 2022. U.S. Pat. No. 17,965,523 and U.S. patent application Ser. No. 18/596,430 are hereby incorporated herein by reference in their respective entireties.

FIELD OF THE DISCLOSURE

This disclosure relates generally to streaming service monitoring and, more particularly, to methods, apparatus, and articles of manufacture to determine penetration and churn of streaming services.

BACKGROUND

In recent years, streaming services (e.g., Netflix®, Hulu®, Amazon Prime Video®, etc.) offer subscriptions to users at a monthly and/or yearly rates in exchange for on demand access to streaming media (e.g., films, television (TV) series, videos, music, etc.). The streaming services can allow the user to enroll, suspend, reenroll, and/or cancel subscriptions via streaming applications (apps) and/or user interfaces via media devices. Typically, user interactions with the streaming apps to enroll, suspend, reenroll, and/or cancel subscriptions is streamlined, such as by way of a discrete number of user inputs (e.g., one, two, three mouse clicks, etc.). Some metering devices can monitor wireless communications (e.g., Wi-Fi signals) in a household to measure usage of the streaming service. When tuning data corresponding to the streaming service and the media device is obtained over time, analyses associated with subscription retention of the household to the streaming service can be determined.

Figure 1:
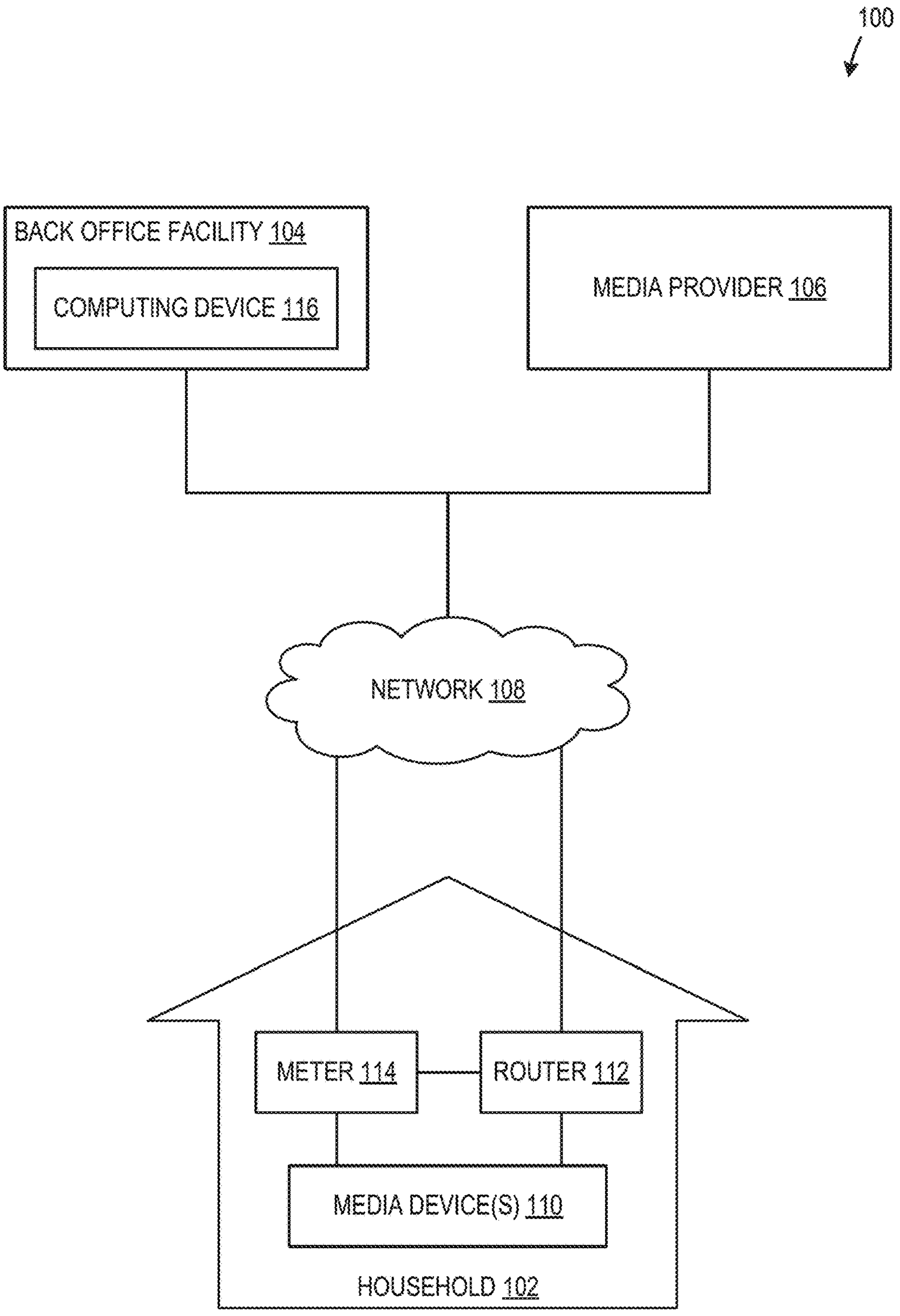
FIG. 1 is a schematic illustration of an example environment in which usage of a streaming platform may be monitored.

In general, the same reference numbers will be used throughout the drawing(s) and accompanying written description to refer to the same or like parts. The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

Unless specifically stated otherwise, descriptors such as “first,” “second,” “third,” etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor “first” may be used to refer to an element in the detailed description, while the same element may be referred to in a claim with a different descriptor such as “second” or “third.” In such instances, it should be understood that such descriptors are used merely for identifying those elements distinctly that might, for example, otherwise share a same name.

As used herein, “approximately” and “about” modify their subjects/values to recognize the potential presence of variations that occur in real world applications. For example, “approximately” and “about” may modify dimensions that may not be exact due to manufacturing tolerances and/or other real world imperfections as will be understood by persons of ordinary skill in the art. For example, “approximately” and “about” may indicate such dimensions may be within a tolerance range of +/−10% unless otherwise specified in the below description. As used herein “substantially real time” refers to occurrence in a near instantaneous manner recognizing there may be real world delays for computing time, transmission, etc. Thus, unless otherwise specified, “substantially real time” refers to real time +/−1 second.

As used herein, the phrase “in communication,” including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, “processor circuitry” is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

DETAILED DESCRIPTION

Users of a streaming service can often enroll and/or cancel a subscription for such service promptly and with relative ease, such as with one or two inputs (e.g., mouse clicks, screen touches, etc.) to a streaming application of the streaming service. In contrast, cable or satellite service users typically undergo one or more intermediate steps (e.g., communicating with technicians, administrators, etc.) to subscribe and/or unsubscribe from the cable or satellite service. Since users can subscribe and cancel to/from streaming services with relative ease, it has become exceedingly difficult for monitoring companies to track household usage of the streaming services and subscription statuses thereto. The monitoring companies can use the household usage and subscriptions to perform penetration and churn analyses corresponding to the streaming services.

Monitoring companies desire knowledge on how users interact with streaming services via media devices such as smartphones, tablets, laptops, smart televisions, etc. In particular, media monitoring companies rely on streaming service monitoring at the media devices to, among other things, quantify audience exposure to media, determine audience behaviors, monitor subscription statuses to the streaming service, predict trends based on available media, etc. Since many streaming services include minimal or no advertisements, many media monitoring companies desire knowledge on penetration and churn of the streaming services rather than advertisement exposure or interaction. As used herein, the term "streaming services" refers to streaming media sources provided by companies and/or organizations via websites and/or streaming apps.

To track household usage of streaming services, media monitoring companies can place metering devices (e.g., a streaming meter) in panel households to monitor when panelists are using the streaming services. Panelists are users registered on panels maintained by a ratings entity (e.g., an audience measurement company, the media monitoring company, etc.) that owns and/or operates the ratings entity subsystem. Panel households may be streaming households that are homes to which streaming media is transmitted and in which media devices present the streaming media via Wi-Fi internet, cable, satellite, etc. The meter can retrieve network traffic in the panel household, detect presentation of streaming media of the streaming services, and generate tuning data associated with the streaming media. As used herein, "tuning data" refers to the raw data that the meter collects via network traffic, such as the uniform resource locator (URL) of the streaming service being used, a media device on which the streaming media is presented, a start timestamp of the usage, an end timestamp of the usage, a bandwidth consumption of the usage, etc. As used herein, "tuning event" refers to a collection of processed tuning data that indicates a timeframe/time period during which a streaming service is used to present streaming media. For example, the meter can collect first tuning data corresponding to a first URL, a start timestamp, an end timestamp, and a bandwidth that is indicative of retrieving a video stream via a network. The meter can send the tuning data to a back office facility where a first tuning event is generated based on the tuning data. The media monitoring company uses the tuning event and other tuning events associated with the streaming service to track household usage, subscription statuses, and/or other analyses (e.g., penetration and churn) corresponding to the streaming service.

Streaming media is defined to include media data (such as audio and/or video data) transmitted from a media source (e.g., a streaming service) over a data network to a media device for presentation such that a portion of the media data is presented (possibly after buffering at the media device) while a subsequent portion of the media data is being received (and possibly buffered at the media device). In some examples, the media source corresponds to Amazon Music, Amazon Video, CBS All Access, Disney+, Google Play Music, Hulu, YouTube, etc. (the media source may also be known as a media provider), the media device corresponds to, for example, a desktop computer, a laptop computer, a mobile computing device, a television, a smart phone, a mobile phone, an Apple® iPad®, an Apple® iPhone®, an Apple® iPod®, an Android™ powered computing device, a Palm® webOS® computing device, etc., and the data network corresponds to the Internet and/or a private network. In some examples, the media data is transmitted from the media source to the media device using one or more data transport streams established according to one or more existing and/or future network streaming communication protocols, such as Dynamic Adaptive Streaming over HTTP (DASH), HTTP live streaming (HLS), Real-time Transport Protocol (RTP), etc.

As used herein, "penetration" refers to the maximum number of individuals (or households) of a target population that can possibly be reached via a streaming service. In other words, penetration refers to a subset of the target population that is subscribed to the streaming service. Penetration can be used to indicate a market share of the media provider. For example, the monitoring company can determine that 80% of households in the target population are subscribed to a streaming service at a given time. Thus, the media provider of the streaming service can provide media to 80% of the target population at a given time, and the penetration of the streaming service is said to be 80%. The target population can be a total panel household population, a demographic population, a total population, a regional population, etc.

As used herein, "churn" refers to a rate at which households and/or users cancel or do not renew a subscription to a streaming service. In other words, churn refers to a rate at which households stop doing business with the media provider over a given period of time. The higher the churn for the given period of time, the more households canceled or did not renew subscriptions to the streaming service. Churn can indicate subscription trends of the streaming service and can be used by the media provider to determine media that may have reduced churn. For example, a streaming service has a first churn of 50% prior to a release of new media and the same streaming service has a second churn of 20% following the release of the new media. In such an example, the churn decreased by 30%, meaning that the subscription retention of the streaming service increased, which may be attributed to the release of the new media.

Example methods, apparatus, and articles of manufacture are disclosed herein to determine penetration and churn of streaming services. Examples disclosed herein can determine household subscription retention over a given period of time to generate analytical data (e.g., penetration, churn, etc.) corresponding to the streaming service for the given time period or a subset of the time period. In some examples, the media monitoring company can send the analytical data to the media provider such that the media provider can determine media programming, subscription cost, services offered, etc. that may have influenced, caused, or otherwise determined the penetration and churn of the streaming service(s) the media provider offer(s).

Referring now to FIG. 1, an example environment 100 in which usage of a streaming platform may be monitored is shown. The environment 100 includes an example household 102 connected to an example back office facility 104 and an example media provider 106 via a network 108. The household 102 includes an example media device 110, an example router 112, and an example meter 114. The back office facility 104 includes an example computing device 116. The computing device 116 can include discrete or integrated server(s), workstation(s), personal computer(s), etc.

The household 102 illustrated in FIG. 1 is a panel household as previously described. Users (panelists) in panel households can have agreements with the monitoring company (e.g., an owner/operator of the back office facility 104) to consent to tracking of media consumption and/or media services (e.g., streaming, cable, satellite services, etc.) via monitoring technology (e.g., hardware metering devices, software metering applications, etc.) installed in the panel household. Although one household 102 is illustrated in FIG. 1, a plurality of households can be included in the environment 100. In some examples, data (e.g., tuning data, tuning events, analytical data, etc.) of the household 102 can be aggregated with data of the plurality of households to analyze streaming service usage on a target population level. In other words, the aggregated data corresponding to panel households can be extrapolated to represent a larger population. For example, when the aggregated data shows that a streaming service has a 90% penetration for the plurality of panel households in a given region, then 90% of the total population of the region can be said to subscribe to the streaming service.

The environment 100 illustrated in FIG. 1 includes the example back office facility 104 to obtain tuning data from the household 102, generate tuning events based on the tuning data, and measure usage (e.g., penetration and churn) of streaming services with a computing system (e.g., the computing device 116). The example back office facility 104 is a physical location of the monitoring company where operations can be conducted without customer and/or client interaction. For example, the back office facility 104 can store and manage servers (e.g., the computing device 116) to process data obtained from panel households, determine subscriptions of the households to the streaming services, and determine penetration and churn of the streaming platforms. Analytical data (e.g., penetration and churn) that the back office facility 104 generates based on data from the example household 102 (or aggregated households) can be provided and sold to customers such as the media provider(s) 106.

The environment 100 illustrated in FIG. 1 includes the media provider 106 to transmit streaming media to the example wireless router 112 via one or more streaming services. The example media provider 106 can be an organization (e.g., Amazon, Disney, Netflix, etc.) that creates and/or distributes viewable and/or listenable media (e.g., films, television shows, music, etc.) to audiences, devices, households, and so forth. The media provider 106 can maintain one or more streaming services (e.g., Disney can own Disney+®, Hulu®, FOX NOW®, etc.) that users can access via streaming applications, websites, etc.

The environment 100 illustrated in FIG. 1 includes the media device(s) 110 to present streaming media to a user/panelist in the household 102. As mentioned previously, the example media device(s) 110 can include a personal computer, a smart television, a mobile device, a laptop, a tablet, etc. Although one media device 110 is shown in FIG. 1, the household 102 can include a plurality of media devices 110 that can obtain media data from the media provider 106 via the network 108 and the router 112. The meter 114 can detect which of the media device(s) 110 is accessing streaming media of the streaming service at a given time. Furthermore, the meter 114 can generate different sets of tuning data corresponding to different media devices 110 when multiple media devices 110 are using streaming service(s) at a given time.

The environment 100 illustrated in FIG. 1 includes the example wireless router 112 to direct media data transmitted from the media provider 106 to the media device(s) 110 in the household 102 via wireless signals. For example, the wireless router 112 is a Wi-Fi router that uses the Wi-Fi protocol to send media data from the media provider 106 to the media device(s) 110.

The example meter 114 (e.g., a streaming meter) is included in the environment 100 of FIG. 1 to measure network traffic and to detect streaming services used to present streaming media on the media device(s) 110 during a given timeframe. In some examples, the meter 114 intercepts wireless signals sent from the router 112 to the media device(s) 110 to monitor network traffic in the household 102. In some other examples, the meter 114 obtains the credentials of the router 112, connects directly to the media provider 106 via the network 108, and wirelessly routes the streaming media to the media device(s) 110. Thus, in such examples, the media device(s) 110 can connect directly to the meter 114 to stream media from the media provider 106 and can connect to the router 112 seamlessly if the meter 114 were to shut down, restart, malfunction, etc. In both examples, the meter 114 can detect a URL of the streaming service the user accesses with the media device(s) 110, start and end timestamps corresponding to presentation of the streaming media, and a bandwidth associated with the network traffic between the media device(s) 110 and the media provider 106. In some examples, the meter 114 detects that a bandwidth associated with the network traffic does not correspond to a bandwidth indicative of streaming media. For example, the meter 114 may detect a bandwidth that is more indicative of an update to a streaming application of the streaming service rather than streaming media of the streaming service.

Figure 2:
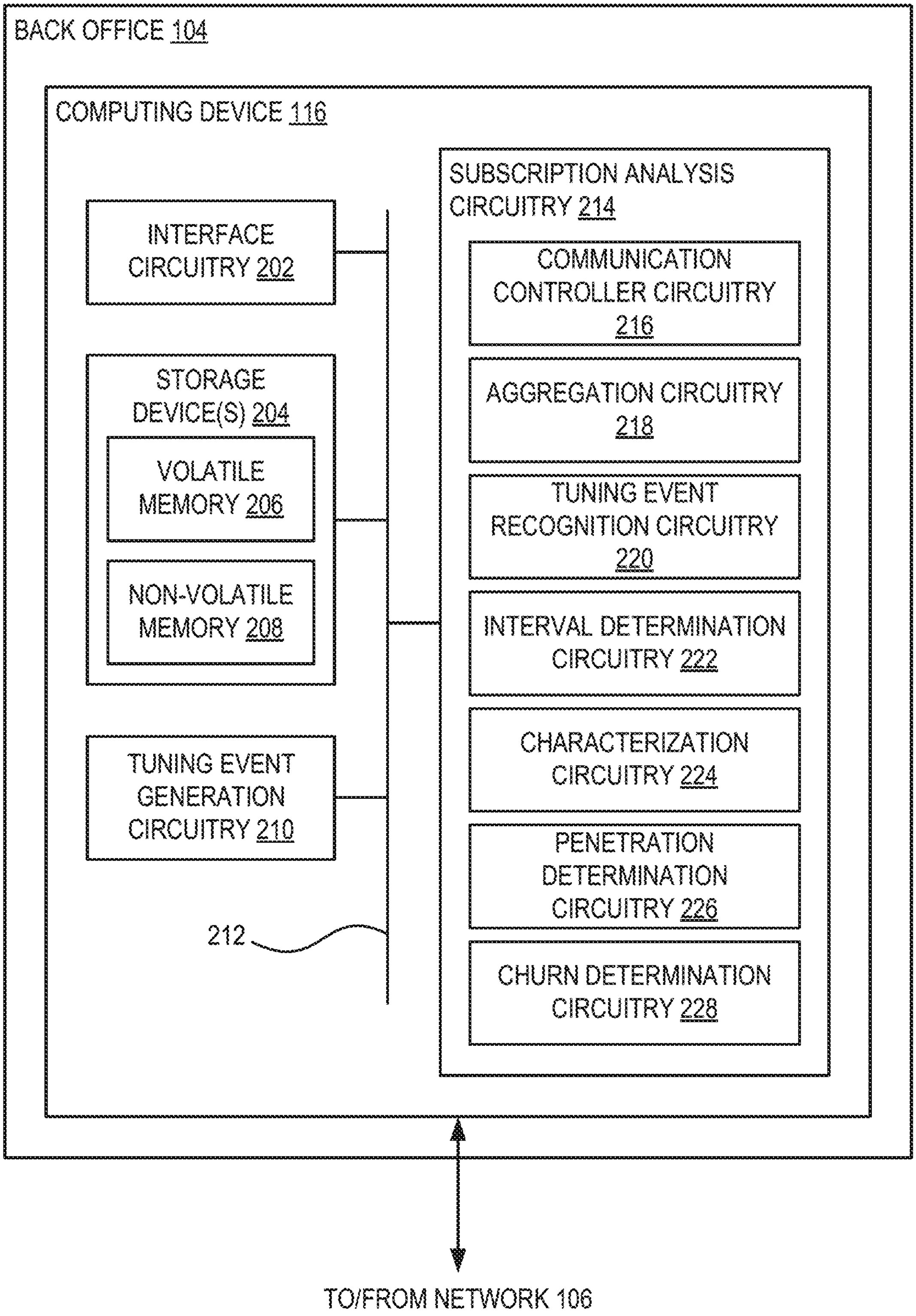
FIG. 2 is a block diagram of an example computing device to determine penetration and churn based on the usage of the streaming platform over time.

FIG. 2 is a block diagram of the example computing device 116 of the back office facility 104 to determine subscription statuses and/or subscription retention of households (e.g., the household 102) and to determine the penetration and churn of streaming services. The computing device 116 of FIG. 2 may be instantiated (e.g., creating an instance of, bring into being for any length of time, materialize, implement, etc.) by processor circuitry such as a central processing unit executing instructions. Additionally or alternatively, the computing device 116 of FIG. 2 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 2 may, thus, be instantiated at the same or different times. Some or all of the circuitry may be instantiated, for example, in one or more threads executing in parallel (overlapping at least partially in time) on hardware and/or in series on hardware. Moreover, in some examples, some or all of the circuitry of FIG. 2 may be implemented by microprocessor circuitry executing instructions to implement one or more virtual machines and/or containers. The example computing device 116 of FIG. 2 includes example interface circuitry 202, example storage device(s) 204 including example volatile memory 206 and example non-volatile memory 208, example tuning event generation circuitry 210, an example bus 212, example subscription analysis circuitry 214, example communication controller circuitry 216, example aggregation circuitry 218, example tuning event recognition circuitry 220, example interval determination circuitry 222, example characterization circuitry 224, example penetration determination circuitry 226, and example churn determination circuitry 228.

The computing device 116 illustrated in FIG. 2 includes the example interface circuitry 202 to communicatively couple the computing device 116 to the meter 114 via the network 108. In some examples, the interface circuitry 202 can be instantiated by a network interface controller (NIC) to connect to the network 108 via a wired connection (e.g., ethernet cable). As illustrated in the example FIG. 2, the interface circuitry 202 can obtain tuning data from the meter 114 and direct the tuning data to integrated circuitry of the computing device 116. Similarly, the interface circuitry 202 can send analytical data (e.g., penetration data, churn data, etc.) from the integrated circuitry of the computing device 116 to the media provider 106.

The computing device 116 illustrated in FIG. 2 includes the example storage device(s) 204 to store data and written instructions corresponding to the example methods and apparatus disclosed herein. As illustrated in FIG. 2, the storage device(s) 204 can include one or more of example volatile memory 206 and example non-volatile memory 208. The example volatile memory 206 can include cache memory and/or random access memory (RAM) to temporarily store data such as tuning data generated by the meter 114, tuning events generated by the tuning event circuitry 210, penetration data, churn data, and so forth. The example non-volatile memory 208 can include flash memory, read-only memory, and/or magnetic storage device(s) to permanently store example written instructions and/or operations for the programmable circuitry 214 to execute.

The computing device 116 illustrated in FIG. 2 includes the example tuning event generation circuitry 210 to create tuning events based on tuning data collected by the meter 114. In some examples, the tuning event generation circuitry 210 is instantiated by processor circuitry executing tuning event generation instructions and/or configured to perform operations such as those represented by the flowchart of FIG. 3. In some examples, the meter 114 identifies what streaming service the media device(s) 110 use(s) to present streaming media. The meter 114 can also identify when the media device(s) 110 initiate(s) and cease(s) usage of the streaming service for presentation, such as in the form of a start timestamp and an end timestamp. The example tuning event generation circuitry 210 can compile the tuning data associated with a media device 110 and collected between the start timestamp and the end timestamp. Furthermore, the example tuning event generation circuitry 210 can generate a tuning event as a data point that represents the tuning data collected over the time period (e.g., between the start and end timestamps). Thus, the example tuning events indicate usage of streaming services and can include a media device identifier, a streaming service identifier, a start timestamp, an end timestamp, a usage timeframe, etc.

The computing device 116 illustrated in FIG. 2 includes the example subscription analysis circuitry 214 to determine household subscription statuses for streaming services over a time period and to determine analytical data (e.g., penetration data, churn data, etc.) corresponding to the streaming service. The example subscription analysis circuitry 214 can cause communication of data, recognize tuning events of households, determine intervals between tuning events, characterize subscription statuses of households, aggregate data of households, determine penetration data, and/or determine churn data as disclosed herein. The computing device 116 of FIG. 2 includes the example bus 212 to communicatively couple processing circuitry (e.g., the subscription analysis circuitry 214 and/or the tuning event generation circuitry 210), memory (e.g., the storage device(s) 204, the non-volatile memory 208, and/or the volatile memory 206), and input/output device(s) (e.g., the interface circuitry 202) of the computing device 116.

The computing device 116 of FIG. 2 includes the example communication controller circuitry 216 to cause the communication of data to and from the household 102, the meter 114, and/or the router 112 via the interface circuitry 202. In some examples, the communication controller circuitry 216 is instantiated by processor circuitry executing communication controller instructions and/or configured to perform operations such as those represented by the flowchart of FIG. 3. In some examples, the communication controller circuitry 216 causes tuning data to be retrieved from the meter 114 to be used to generate tuning events. In some examples, the communication controller circuitry 216 causes analytical data (e.g., penetration and churn) corresponding to the streaming services to be transmitted to the media provider 106 to be used for media exposure analysis, audience behavior analysis, predictive subscription analysis, etc.

The computing device 116 of FIG. 2 includes the example aggregation circuitry 218 to aggregate, combine, merge, etc. tuning events corresponding to households and streaming services. In some examples, the aggregation circuitry 218 is instantiated by processor circuitry executing aggregation instructions and/or configured to perform operations such as those represented by the flowchart of FIG. 3. The aggregation circuitry 218 can identify household and streaming services corresponding to tuning events stored in the storage device(s) 204. In some examples, the aggregation circuitry 218 rearranges the tuning events in volatile and/or non-volatile memory 206, 208 such that tuning events of a same household and/or a same streaming service are in the same storage location. In some examples, the aggregation circuitry 218 communicates the storage location to the example tuning event recognition circuitry 220 and/or the characterization circuitry 224 when the tuning events are aggregated and/or in response to a query.

The computing device 116 of FIG. 2 includes the example tuning event recognition circuitry 220 to detect, recognize, identify, etc. tuning events corresponding to households and streaming services generated over a time period. In some examples, the tuning event recognition circuitry 220 is instantiated by processor circuitry executing tuning event recognition instructions and/or configured to perform operations such as those represented by the flowchart of FIG. 4. In some examples, the tuning event generation circuitry 210 stores tuning events corresponding to a household and a streaming service in the storage device(s) 204. The tuning event recognition circuitry 220 can identify the household and the streaming service of a tuning event in the storage device(s) 204 as well as detect the timestamp of the tuning event. In some examples, the tuning event recognition circuitry 220 can recognize an initial tuning event (e.g., an earliest tuning event) in the time period corresponding to the household and the streaming service. As described below, the characterization circuitry 224 can set a subscription status of the household as initially subscribed to the streaming service at the time of the tuning event. In some examples, the tuning event recognition circuitry 220 can search and/or send a query to the storage device(s) 204 to determine whether a subsequent tuning event of the household and the streaming service was obtained, generated, stored, etc. during the time period.

The computing device 116 of FIG. 2 includes the example interval determination circuitry 222 to determine, calculate, process, etc. a time interval between a preceding tuning event and a subsequent tuning event. In some examples, the interval determination circuitry 222 is instantiated by processor circuitry executing interval determination instructions and/or configured to perform operations such as those represented by the flowchart of FIG. 4. When the tuning event recognition circuitry 220 determines that a subsequent tuning event exists following a preceding tuning event (e.g., the initial tuning event), the interval determination circuitry 222 can determine a time frame and/or interval between the preceding and subsequent tuning events. For example, the interval determination circuitry 222 can subtract a timestamp of the preceding tuning event from a timestamp of the subsequent tuning event to determine the interval. In some examples, the tuning event recognition circuitry 220 determines that no subsequent tuning event occurred after the preceding tuning event. In such examples, the interval determination circuitry 222 determines the time interval between the preceding tuning event and a current timestamp. The current timestamp can be a time corresponding to an occurrence of the tuning event generation, the subscription status characterization, etc. In general, the current timestamp corresponds to an end time of the time period being examined, the end time following the temporally latest tuning event of the time period.

The computing device 116 of FIG. 2 includes the example characterization circuitry 224 to characterize, assign, indicate, etc. subscription status(es) of a household for streaming service(s) over a time period. In some examples, the characterization circuitry 224 is instantiated by processor circuitry executing characterization instructions and/or configured to perform operations such as those represented by the flowcharts of FIGS. 3 and 4. The characterization circuitry 224 can determine whether the household 102 was subscribed to the streaming service during the interval between preceding and subsequent tuning events based on the length of the interval and a retention threshold. Additionally, the characterization circuitry 224 can determine whether the household 102 is currently subscribed to the streaming service based on the length of the interval between the preceding tuning event and the current timestamp and the retention threshold. When the characterization circuitry 224 determines that the interval satisfies (e.g., is less than) an example retention threshold, the characterization circuitry 224 characterizes the subscription status of the household 102 as subscribed to the streaming service during the interval. Alternatively, when the characterization circuitry 224 determines that the interval does not satisfy (e.g., is greater than) the retention threshold, the characterization circuitry 224 characterizes the household 102 as unsubscribed to the streaming service during the interval.

An example use case of subscription status characterization of a household over a time period is described. In such an example use case, the time period under examination is three months. The tuning event recognition circuitry 220 detects that a first (e.g., preceding) tuning event exists corresponding to the household and a streaming service. The tuning event recognition circuitry 220 also detects that a second (e.g., subsequent) tuning event exists corresponding to the household and the streaming service. The interval determination circuitry 222 calculates a time interval between an end timestamp of the first tuning event and a start timestamp of the second tuning event. The characterization circuitry 224 determines whether the time interval satisfies the retention threshold. When the time interval satisfies the retention threshold, the characterization circuitry 224 characterizes the subscription status of the household as subscribed during the time interval. Alternatively, when the time interval does not satisfy the retention threshold, the characterization circuitry 224 characterizes the subscription status of the household as unsubscribed during the time interval. The tuning event recognition circuitry 220, the interval determination circuitry 222 and the characterization circuitry 224 repeat tuning event detections, interval determinations, and subscription status characterizations, respectively, for the time period. Thus, consecutive subscription statuses are determined/characterized for the time period to indicate the portions of the time period when the household is subscribed or unsubscribed to the streaming service.

The example retention threshold can be predetermined by the back office facility 104 and/or the media provider 106 based on a likelihood of household(s) to be subscribed to a streaming service during a period of inactivity. For example, there can be predeterminations that the household 102 is substantially likely (e.g., 80%, 90%, 95% likely, etc.) to have unsubscribed from the streaming service when the household 102 has not used (e.g., not played streaming media from) the streaming service for a time interval (e.g., three months, four months, six months, etc.). Thus, the back office facility 104 and/or media provider 106 can determine the retention threshold based on the time interval. In some examples, particular retention thresholds can be associated with particular households based on historical studies, observations, trends, and/or analyses of subscription statuses over time. In other words, a specific retention threshold can apply to a specific subset of households based on the type, demographic, income bracket, and/or other characteristics of the households in the subset. Additionally or alternatively, particular retention thresholds can be associated with particular streaming services based on historical studies, observations, trends, and/or analyses of subscriptions to the streaming service over time. In other words, a specific retention threshold can apply to a specific subset of streaming services based on the type, genre, time in use, and/or other characteristics of the streaming services in the subset. In general, there can be one retention threshold applicable to all households and streaming services, or there can be a plurality of retention thresholds applicable to various households and/or streaming services. Thus, in some examples, the characterization circuitry 224 can determine which retention threshold corresponds to the subscription status being characterized based on the associated household and/or streaming service.

The computing device 116 of FIG. 2 includes the example penetration determination circuitry 226 to determine, process, analyze, etc. penetration data corresponding to a streaming service. In some examples, the penetration determination circuitry 226 is instantiated by processor circuitry executing penetration determination instructions and/or configured to perform operations such as those represented by the flowcharts of FIGS. 3 and 5. The example penetration determination circuitry 226 can calculate penetration data for the streaming service that describes a trend of subscriptions to the streaming service over a time period. For example, the penetration data can be structured as a chart to represent percentages of households subscribed to the streaming service as a function of time. Thus, the media provider 106 can observe how subscriptions to the streaming service fluctuate over the time period.

The example penetration determination circuitry 226 can determine penetration data points and combine the penetration data points to determine the penetration data (e.g., the penetration trend of the streaming service). In some examples, the penetration determination circuitry 226 obtains times of interest from the back office facility 104, the times of interest being the times at which the penetration data points are to be determined. The times of interest can be separated by intervals (e.g., one day, one week, one month, etc.) and can be within the time period for which penetration data is calculated. In some examples, the times of interest are stored in memory (e.g., non-volatile memory 208) and/or included in example instructions and/or operations represented by the flowcharts of FIGS. 3 and 5. In some examples, the times of interest correspond to time increments (e.g., one hour, one day, one week, etc.) at which penetration data points are to be determined. In such examples, the penetration determination circuitry 226 determines a penetration data point at a time of interest and then a plurality of penetration data points at subsequent times of interests that occur at each time increment thereafter.

The example penetration determination circuitry 226 obtains subscription statuses of households corresponding to a first time of interest. In some examples, the penetration determination circuitry 226 obtains the subscription statuses from the storage device(s) 204 (e.g., volatile memory 206). In some other examples, the penetration determination circuitry 226 obtains the subscription statuses directly from the characterization circuitry 224.

The penetration determination circuitry 226 can determine a number of households subscribed to the streaming service at the first time of interest based on the subscription statuses. The penetration determination circuitry 226 determines a first penetration data point based on a ratio of the number of subscribed households to the total number of households. In some examples, the subscription statuses are associated with a total population area, and the total number of households corresponds to a total number of panel households in the total population area. In some other examples, the subscription statuses are associated with a region of the population area, and the total number of households corresponds to a number of panel households in the region of the population area. Following calculation of the first penetration data point, the penetration determination circuitry 226 determines whether there are more times of interest. For example, the penetration determination circuitry 226 can query the storage device(s) 204 to determine whether a second penetration data point is to be generated for a second time of interest. When a sufficient number of penetration data points are processed, the penetration determination circuitry 226 combines the penetration data points to generate the penetration data (e.g., the penetration trend) for the streaming service.

An example use case of penetration data determination for a streaming service is described. A time period for which the penetration data is to be calculated corresponds to a two week period because the streaming service releases new streaming media (e.g., a new season of a TV series) at the end of the first week of the time period. Times of interest correspond to days of the time period such that the penetration data includes fourteen distinct penetration data points. Thus, the penetration data generated by the penetration determination circuitry 226 can describe how subscriptions may increase due to the release of the new streaming media.

The computing device 116 of FIG. 2 includes the example churn determination circuitry 228 to determine, process, analyze, etc. churn data corresponding to a streaming service. In some examples, the churn determination circuitry 228 is instantiated by processor circuitry executing churn determination instructions and/or configured to perform operations such as those represented by the flowcharts of FIGS. 3 and 6. The example churn determination circuitry 228 can calculate churn data that describes a trend of subscription cancellation rates during a time period. For example, the churn data can be structured as a chart to represent cancellations per unit time as a function of time. In some examples, the unit time is a day, and the time period is a two week period. Thus, in such examples, the churn data includes fourteen distinct churn data points describing how cancellation rates fluctuate over the two week time period.

The example churn determination circuitry 228 can determine churn data points and combine the churn data points to determine the churn data (e.g., the churn trend of the streaming service). In some examples, the churn determination circuitry 228 obtains time frames of interest from the back office facility 104, the time frames of interest being the times at which the churn data points are to be determined. The time frames of interest can span consecutive subsets of time (e.g., one day, one week, one month, etc.) within the time period for which the churn data is calculated. In some examples, the time frames of interest are stored in memory (e.g., non-volatile memory 208) and/or included in example instructions and/or operations represented by the flowcharts of FIGS. 3 and 6. In such examples, the churn determination circuitry 228 determines a churn data point at a time frame of interest and then a plurality of churn data points at consecutive time frames of interest that occur thereafter.

The example churn determination circuitry 228 obtains subscription statuses of households corresponding to a first time frame of interest. In some examples, the churn determination circuitry 228 obtains the subscription statuses from the storage device(s) 204 (e.g., volatile memory 206). In some other examples, the churn determination circuitry 228 obtains the subscription statuses directly from the characterization circuitry 224.

The example churn determination circuitry 228 can determine a number of households that canceled subscriptions to the streaming service during the time frame of interest based on the subscription statuses. For example, the time frame of interest can correspond to one day. When a first household includes a subscribed status that changes to an unsubscribed status during the one day, the churn determination circuitry 228 can determine that the first household canceled a subscription to the streaming service during the time frame. The churn determination circuitry 228 determines a first churn data point based on a ratio of the number of canceled households to the time frame. In some examples, the subscription statuses are associated with a total population area, and in some other examples, the subscription statuses are associated with a region of the population area. Following calculation of the first churn data point, the churn determination circuitry 228 determines whether there are more time frames of interest. For example, the churn determination circuitry 228 can query the storage device(s) 204 to determine whether a second churn data point is to be generated for a second time frame of interest. When a sufficient number of churn data points are processed, the churn determination circuitry 228 combines the churn data points to generate the churn data (e.g., the churn trend) for the streaming service.

An example use case of churn data determination for a streaming service is described. A time period for which the churn data is to be calculated corresponds to a two week period because the streaming service discontinues a streaming media (e.g., a TV series) at the end of the first week of the time period. Time frames of interest correspond to days of the time period such that the churn data includes fourteen distinct churn data points. Thus, the churn data generated by the churn determination circuitry 228 can describe how cancellation rates may increase due to the removal of the streaming media.

In some examples, the computing device 116 includes means for causing (e.g., enacting, initiating, triggering, etc.) communication of data to/from the computing device 116. For example, the means for causing communication may be implemented by communication controller circuitry 216. In some examples, the communication controller circuitry 216 may be instantiated by processor circuitry such as the example processor circuitry 712 of FIG. 7. For instance, the communication controller circuitry 216 may be instantiated by the example microprocessor 800 of FIG. 8 executing machine executable instructions such as those implemented by at least block 316 of FIG. 3. In some examples, the communication controller circuitry 216 may be instantiated by hardware logic circuitry, which may be implemented by an ASIC, XPU, or the FPGA circuitry 900 of FIG. 9 structured to perform operations corresponding to the machine readable instructions. Additionally or alternatively, the communication controller circuitry 216 may be instantiated by any other combination of hardware, software, and/or firmware. For example, the communication controller circuitry 216 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the computing device 116 includes means for aggregating (e.g., combining, structuring, sorting, etc.) tuning data and/or tuning events obtained and/or generated by the computing device 116. For example, the means for aggregating may be implemented by aggregation circuitry 218. In some examples, the aggregation circuitry 218 may be instantiated by processor circuitry such as the example processor circuitry 712 of FIG. 7. For instance, the aggregation circuitry 218 may be instantiated by the example microprocessor 800 of FIG. 8 executing machine executable instructions such as those implemented by at least block 304 of FIG. 3. In some examples, the aggregation circuitry 218 may be instantiated by hardware logic circuitry, which may be implemented by an ASIC, XPU, or the FPGA circuitry 900 of FIG. 9 structured to perform operations corresponding to the machine readable instructions. Additionally or alternatively, the aggregation circuitry 218 may be instantiated by any other combination of hardware, software, and/or firmware. For example, the aggregation circuitry 218 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the computing device 116 includes means for recognizing (e.g., detecting, identifying, accessing, etc.) tuning data and/or tuning events obtained and/or generated by the computing device 116. For example, the means for recognizing may be implemented by tuning event recognition circuitry 220. In some examples, the tuning event recognition circuitry 220 may be instantiated by processor circuitry such as the example processor circuitry 712 of FIG. 7. For instance, the tuning event recognition circuitry 220 may be instantiated by the example microprocessor 800 of FIG. 8 executing machine executable instructions such as those implemented by at least blocks 318 of FIG. 3 and 402, 404, 422 of FIG. 4. In some examples, the tuning event recognition circuitry 220 may be instantiated by hardware logic circuitry, which may be implemented by an ASIC, XPU, or the FPGA circuitry 900 of FIG. 9 structured to perform operations corresponding to the machine readable instructions. Additionally or alternatively, the tuning event recognition circuitry 220 may be instantiated by any other combination of hardware, software, and/or firmware. For example, the tuning event recognition circuitry 220 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the computing device 116 includes means for generating (e.g., determining, computing, processing, etc.) penetration data for streaming services. For example, the means for generating may be implemented by penetration determination circuitry 226. In some examples, the penetration determination circuitry 226 may be instantiated by processor circuitry such as the example processor circuitry 712 of FIG. 7. For instance, the penetration determination circuitry 226 may be instantiated by the example microprocessor 800 of FIG. 8 executing machine executable instructions such as those implemented by at least blocks 312 of FIG. 3 and 502-510 of FIG. 5. In some examples, the penetration determination circuitry 226 may be instantiated by hardware logic circuitry, which may be implemented by an ASIC, XPU, or the FPGA circuitry 900 of FIG. 9 structured to perform operations corresponding to the machine readable instructions. Additionally or alternatively, the penetration determination circuitry 226 may be instantiated by any other combination of hardware, software, and/or firmware. For example, the penetration determination circuitry 226 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the means for determining includes means for generating (e.g., determining, computing, processing, etc.) churn data for streaming services. For example, the means for generating may be implemented by churn determination circuitry 228. In some examples, the churn determination circuitry 228 may be instantiated by processor circuitry such as the example processor circuitry 712 of FIG. 7. For instance, the churn determination circuitry 228 may be instantiated by the example microprocessor 800 of FIG. 8 executing machine executable instructions such as those implemented by at least blocks 314 of FIG. 3 and 602-610 of FIG. 6. In some examples, the churn determination circuitry 228 may be instantiated by hardware logic circuitry, which may be implemented by an ASIC, XPU, or the FPGA circuitry 900 of FIG. 9 structured to perform operations corresponding to the machine readable instructions. Additionally or alternatively, the churn determination circuitry 228 may be instantiated by any other combination of hardware, software, and/or firmware. For example, the churn determination circuitry 228 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the computing device 116 includes means for determining (e.g., calculating, processing, computing, etc.) time intervals between tuning events. For example, the means for determining may be implemented by interval determination circuitry 222. In some examples, the interval determination circuitry 222 may be instantiated by processor circuitry such as the example processor circuitry 712 of FIG. 7. For instance, the interval determination circuitry 222 may be instantiated by the example microprocessor 800 of FIG. 8 executing machine executable instructions such as those implemented by at least blocks 406 and 414 of FIG. 4. In some examples, the interval determination circuitry 222 may be instantiated by hardware logic circuitry, which may be implemented by an ASIC, XPU, or the FPGA circuitry 900 of FIG. 9 structured to perform operations corresponding to the machine readable instructions. Additionally or alternatively, the interval determination circuitry 222 may be instantiated by any other combination of hardware, software, and/or firmware. For example, the interval determination circuitry 222 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the computing device 116 includes means for characterizing (e.g., labeling, assigning, tagging, etc.) subscription statuses of households as either subscribed or unsubscribed to a streaming service. For example, the means for characterizing may be implemented by characterization circuitry 224. In some examples, the characterization circuitry 224 may be instantiated by processor circuitry such as the example processor circuitry 712 of FIG. 7. For instance, the characterization circuitry 224 may be instantiated by the example microprocessor 800 of FIG. 8 executing machine executable instructions such as those implemented by at least blocks 308 of FIG. 3 and 408-412, 416-420 of FIG. 4. In some examples, the characterization circuitry 224 may be instantiated by hardware logic circuitry, which may be implemented by an ASIC, XPU, or the FPGA circuitry 900 of FIG. 9 structured to perform operations corresponding to the machine readable instructions. Additionally or alternatively, the characterization circuitry 224 may be instantiated by any other combination of hardware, software, and/or firmware. For example, the characterization circuitry 224 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

While an example manner of implementing the computing device 116 of FIG. 1 is illustrated in FIG. 2, one or more of the elements, processes, and/or devices illustrated in FIG. 2 may be combined, divided, re-arranged, omitted, eliminated, and/or implemented in any other way. Further, the example communication controller circuitry 216, the example aggregation circuitry 218, the example tuning event recognition circuitry 220, the example interval determination circuitry 222, the example characterization circuitry 224, the example penetration determination circuitry 226, the example churn determination circuitry 228, and/or, more generally, the example computing device 116 of FIG. 1, may be implemented by hardware alone or by hardware in combination with software and/or firmware. Thus, for example, any of the example communication controller circuitry 216, the example aggregation circuitry 218, the example tuning event recognition circuitry 220, the example interval determination circuitry 222, the example characterization circuitry 224, the example penetration determination circuitry 226, the example churn determination circuitry 228, and/or, more generally, the example computing device 116, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example computing device 116 of FIG. 1 may include one or more elements, processes, and/or devices in addition to, or instead of, those illustrated in FIG. 2, and/or may include more than one of any or all of the illustrated elements, processes and devices.

A flowchart representative of example machine readable instructions, which may be executed to configure processor circuitry to implement the computing device 116 of FIG. 2, is shown in FIGS. 3-6. The machine readable instructions may be one or more executable programs or portion(s) of an executable program for execution by processor circuitry, such as the processor circuitry 712 shown in the example processor platform 700 discussed below in connection with FIG. 7 and/or the example processor circuitry discussed below in connection with FIGS. 8 and/or 9. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowchart illustrated in FIGS. 3-6, many other methods of implementing the example computing device 116 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 3-6 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 3:
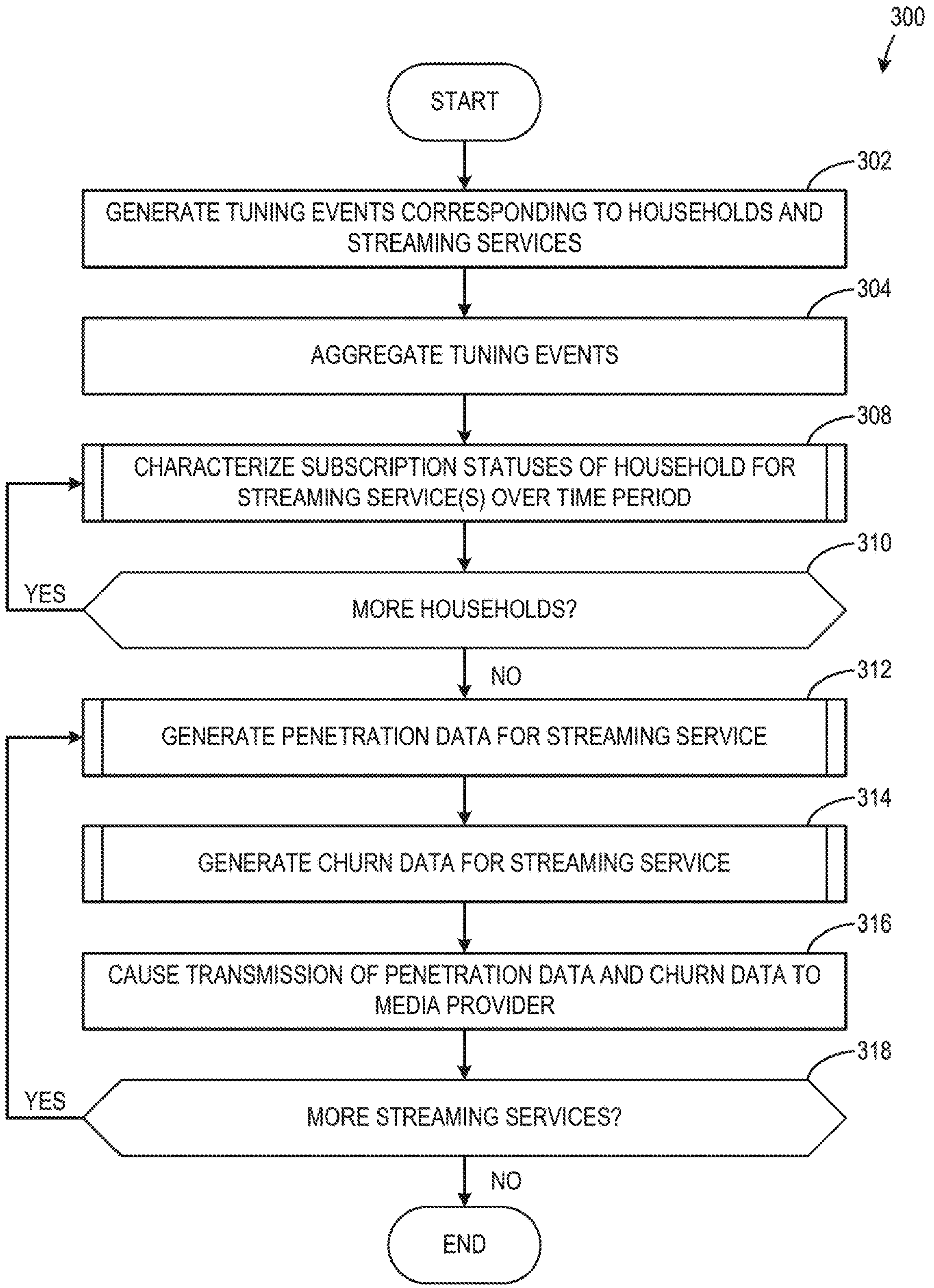
FIGS. 3-6 are a flowcharts representative of example machine readable instructions and/or example operations that may be executed by example processor circuitry to implement the computing device of FIG. 2.

FIG. 3 is a flowchart representative of example machine readable instructions and/or example operations 300 that may be executed and/or instantiated by processor circuitry to implement the tuning event generation circuitry 210 and the subscription analysis circuitry 214 of the computing device 116 to determine penetration and churn of streaming services. The machine readable instructions and/or the operations 300 of FIG. 3 begin at block 302, at which the computing device 116 generates tuning events corresponding to households and streaming services. For example, the tuning event generation circuitry 210 can obtain tuning data corresponding to a usage of a streaming service at a household. The tuning event generation circuitry 210 can obtain the tuning data from the storage device(s) 204, the back office facility 104, the meter 114, etc. Based on the tuning data, the tuning event generation circuitry 210 can generate a tuning event indicating a start timestamp, an end timestamp, a URL of the streaming service, and a media device used to stream media via the streaming service.

At block 304, the computing device 116 aggregates tuning events of households. For example, the aggregation circuitry 218 combines the tuning events of panel households from which tuning data was collected. The tuning events can be aggregated into shared memory space(s) in the non-volatile memory 208 such that tuning events associated with same streaming services, same households, same time periods, etc. are grouped together.

At block 308, the computing device 116 characterizes subscription statuses of a first household for streaming service(s) over a time period. For example, the characterization circuitry 224 characterizes subscription statuses of the first household for a streaming service such that the subscription status corresponding to the first household and the streaming service can indicate whether the first household was subscribed or unsubscribed to the streaming service at a given point in the time period. Further descriptions of example machine readable instructions and/or example operations of block 308 are described in greater detail below with reference to FIG. 4.

At block 310, the computing device 116 determines whether there are more households included in the aggregated tuning event data for which subscription statuses are to be characterized. For example, the tuning event recognition circuitry 220 can search the storage device(s) 204 to determine whether households have uncharacterized subscription statuses or no subscription statuses. When the tuning event recognition circuitry 220 determines that subscription statuses are to be characterized for more households, the example operations 300 return to block 308 where the characterization circuitry 224 characterizes the subscription statuses of a second household or another household.

At block 312, when the tuning event recognition circuitry 220 determines that there are no more households for which subscription statuses are to be characterized, the computing device 116 generates penetration data for a first streaming service. For example, the penetration determination circuitry 226 creates penetration data corresponding to the first streaming service. Further descriptions of example machine readable instructions and/or example operations of block 312 are described in greater detail below with reference to FIG. 5.

At block 314, the computing device 116 generates churn data for the first streaming service. For example, the churn determination circuitry 228 creates churn data corresponding to the first streaming service. Further descriptions of example machine readable instructions and/or example operations of block 314 are described in greater detail below with reference to FIG. 6.

At block 316, the computing device 116 transmits the penetration data and the churn data to the media provider 106 corresponding to the first streaming service. For example, the communication controller circuitry 216 causes the interface circuitry 202 to send the penetration data and the churn data to the media provider 106 that distributes and/or owns the first streaming service.

At block 318, the computing device 116 determines whether there are more streaming services for which penetration data and churn data are to be generated. For example, the tuning event recognition circuitry 220 can search the storage device(s) 204 to determine whether there are streaming services without associated penetration and/or churn data. In other words, the tuning event recognition circuitry 220 may determine that a second streaming service is associated with tuning events in the storage device(s) and that no penetration data or churn data have been generated for the second streaming service. When the tuning event recognition circuitry 220 determines that penetration and churn data are to be generated for more streaming services, the example operations 300 return to block 312 where the penetration determination circuitry 226 generates penetration data for the second streaming service or another streaming service. When the tuning event recognition circuitry 220 determines that there are no more streaming services for which penetration and churn data are to be generated, the example machine readable instructions and/or operations 300 end.

Figure 4:
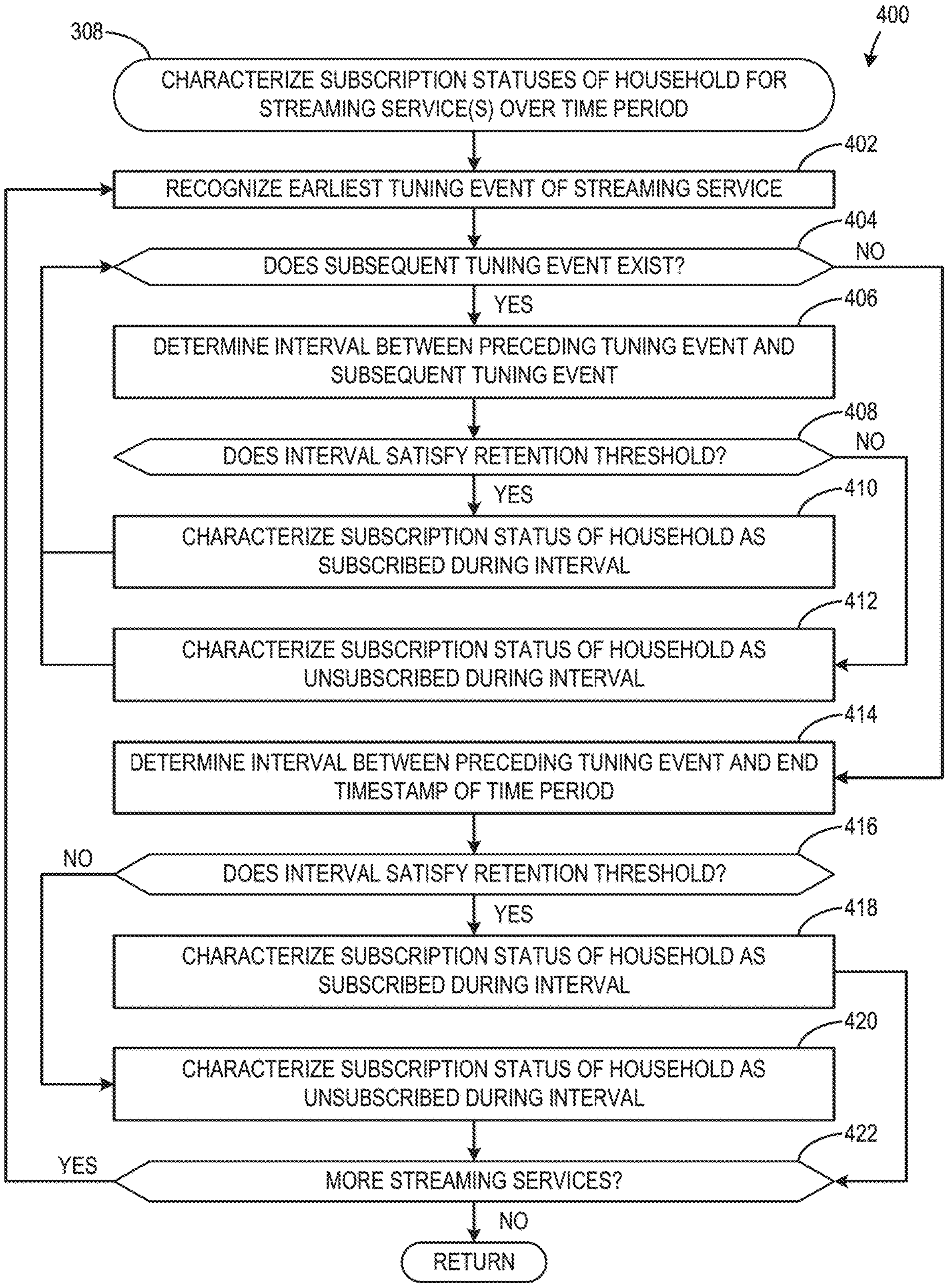

FIG. 4 is a flowchart representative of example machine readable instructions and/or example operations 400 that may be executed and/or instantiated by processor circuitry to implement the tuning event recognition circuitry 220, the interval determination circuitry 222, and the characterization circuitry 224 of the computing device 116 to characterize subscription statuses of a household (e.g., a first household) for streaming service(s) over a time period. The machine readable instructions and/or the operations 400 of FIG. 4 begin at block 402, at which the computing device 116 determines the earliest tuning event corresponding to the household and a first streaming service. For example, the tuning event recognition circuitry 220 searches the storage device(s) 204 for the tuning events corresponding to the household and the first streaming service, sorts the tuning events in temporal order, and determines which tuning event occurs first in the sequence of tuning events.

At block 404, the computing device 116 determines whether a subsequent tuning event exists. For example, the tuning event recognition circuitry 220 calls the same sorted sequence of tuning events and determines whether another tuning event occurred after the earliest tuning event (e.g., the preceding tuning event). When the tuning event determination circuitry 220 determines that no subsequent tuning events occurred after the earliest tuning event, then the example machine readable instructions and/or operations 400 proceed to block 414.

At block 406, when the tuning event determination circuitry 220 determines that a subsequent tuning event did occur after the earliest tuning event, the computing device 116 determines an interval between the preceding tuning event and the subsequent tuning event. For example, the interval determination circuitry 222 calculates a time interval between the preceding and subsequent tuning events. The interval determination circuitry 222 can determine the difference between an end timestamp of the preceding tuning event and a start timestamp of the subsequent tuning event.

At block 408, the computing device 116 determines whether the interval satisfies a retention threshold. For example, the characterization circuitry 224 can compare the interval to the retention threshold and determine whether the interval is greater than or less than the retention threshold.

At block 410, when the characterization circuitry 224 determines that the interval is less than or equal to the retention threshold, then the interval is said to satisfy the retention threshold, and the computing device 116 characterizes a subscription status of the household as subscribed during the interval. For example, the characterization circuitry 224 can generate a subscribed status for the household corresponding to the interval. That is, when the computing device 116 searches the storage device(s) 204 for the subscription status of the household corresponding to a point in time within the interval, the subscription status indicates that the household was subscribed to the first streaming service at the point in time.

At block 412, when the characterization circuitry 224 determines that the interval is greater than the retention threshold, then the interval is said to not satisfy the retention threshold, and the computing device 116 characterizes a subscription status of the household as unsubscribed during the interval. For example, the characterization circuitry 224 can generate an unsubscribed status for the household corresponding to the interval and the first streaming service. Following completion of operations at block 410 or block 412, the example operations 400 return to block 404 at which the computing device 116 (e.g., the tuning event recognition circuitry 220) determines whether another subsequent tuning event exists.

At block 414, when the tuning event recognition circuitry 220 determines that another subsequent tuning event does not exist, the computing device 116 determines an interval between the preceding tuning event and an end timestamp of the time period. For example, the interval determination circuitry 222 calculates the difference between the end timestamp of the time period and the end timestamp of the preceding tuning event. In some examples, when the time period is configured as a given length of time (e.g., one month, three months, one year, etc.) prior to the time of the execution of the example operations 400, the end time of the time period is the current time. In some other examples, when the time period is configured as a given length of time that previously occurred, the end timestamp of the time period is the time at which the time period ended.

At block 416, the computing device 116 determines whether the interval satisfies a retention threshold. For example, similar to example operations of block 408, the characterization circuitry 224 can compare the interval to the retention threshold and determine whether the interval is greater than or less than the retention threshold. T At block 418, when the characterization circuitry 224 determines that the interval satisfies the retention threshold, the computing device 116 characterizes a subscription status of the household as subscribed during the interval. For example, similar to block 410, the characterization circuitry 224 generates a subscribed status for the household corresponding to the interval.

At block 420, when the characterization circuitry 224 determines that the interval does not satisfy the retention threshold, the computing device 116 characterizes a subscription status of the household as unsubscribed during the interval. For example, similar to block 412, the characterization circuitry 224 generates an unsubscribed status for the household corresponding to the interval and the first streaming service. However, unlike example operations of blocks 408-412, the interval associated with example operations of blocks 416-420 and corresponding to the household and the first streaming service is the last interval of the time period or the only interval of the time period.

At block 422, when the characterization circuitry 224 either characterizes the subscription status as subscribed or unsubscribed, the computing device 116 determines whether there are more streaming services associated with the household. For example, the tuning event recognition circuitry 220 searches tuning events corresponding to the household in the storage device(s) 204, sorts and/or filters the tuning events based on streaming service, and cross references against subscription statuses generated for the household. When the tuning events correspond to another streaming service (e.g., a second streaming service) different than the first streaming service, then the example machine readable instructions and/or example operations 400 return to block 402. When the tuning event recognition circuitry 220 determines that there are no more streaming services corresponding to tuning events of the household for which subscription statuses are to be characterized, then the example instructions and/or example operations 400 return to block 310 of FIG. 3.

Figure 5:
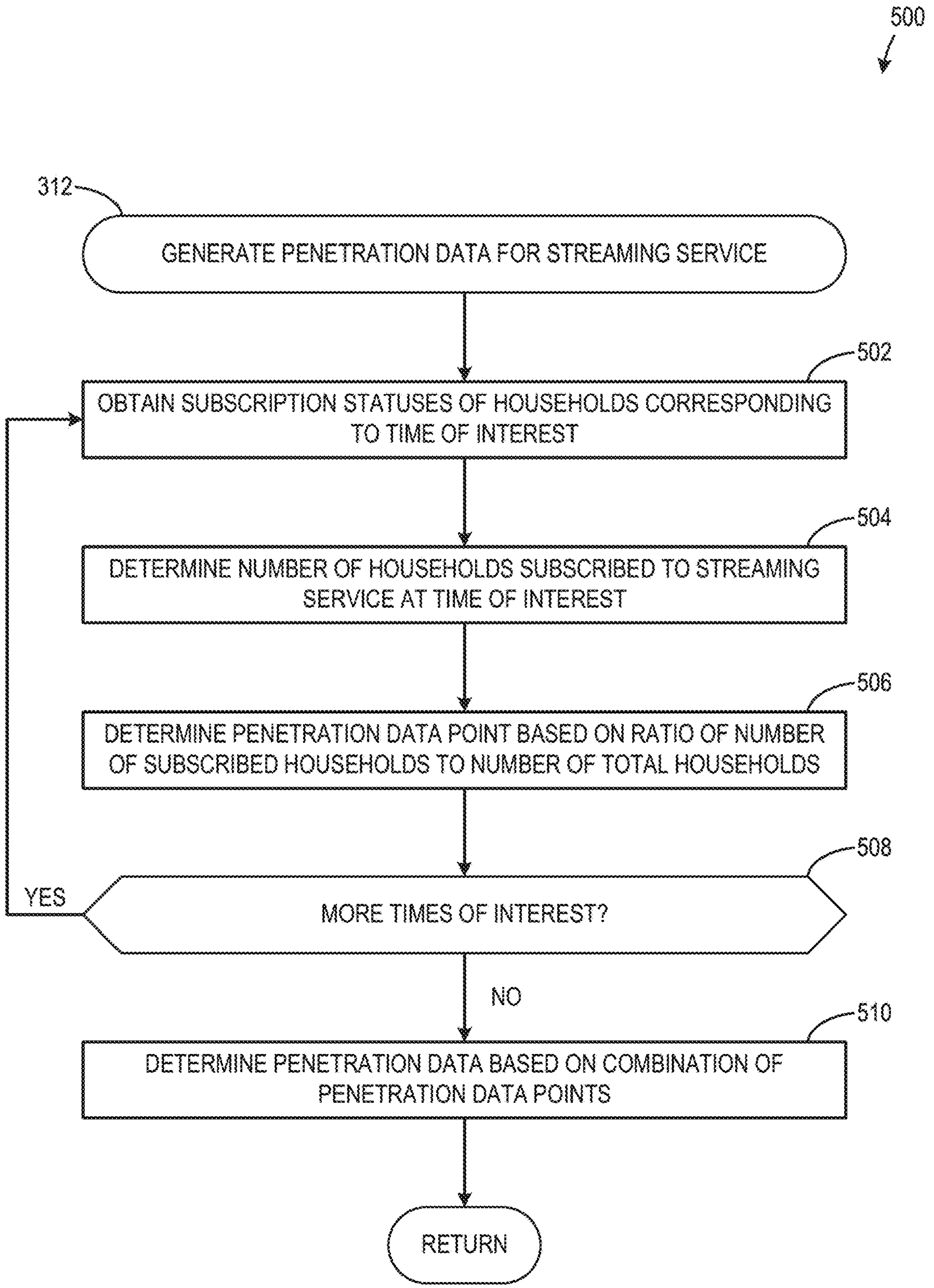

FIG. 5 is a flowchart representative of example machine readable instructions and/or example operations 500 that may be executed and/or instantiated by processor circuitry to implement the penetration determination circuitry 226 of the computing device 116 to determine penetration data the first streaming service. The machine readable instructions and/or the operations 500 of FIG. 5 begin at block 502, at which the computing device 116 obtains subscription statuses of households corresponding to a first time of interest. For example, the penetration determination circuitry 226 can search the storage device(s) 204 (e.g., the non-volatile memory 208) for the subscription statuses corresponding to the streaming service and the first time of interest. The penetration determination circuitry 226 can store the corresponding subscription statuses in a storage location (e.g., in the volatile memory 206) different than the location in which a bulk of subscription statuses are stored.

At block 504, the computing device 116 determines a number of households subscribed to the first streaming service at the first time of interest. For example, the penetration determination circuitry 226 can increment a counter of the number of households with subscription statuses characterized as subscribed at the first time of interest.

At block 506, the computing device 116 determines a first penetration data point corresponding to the first streaming service and the first time of interest. For example, the penetration determination circuitry 226 determines the first penetration data point based on a ratio of the number of subscribed households to a total number of households in a population area, a region of the population area, etc.

At block 508, the computing device 116 determines whether there are more times of interest for which penetration data points are to be determined. For example, the penetration determination circuitry 226 determines whether there is a second time of interest based on the example instructions and/or example operations 500, such as based on whether another time increment after the first time of interest is within a time period being examined by the penetration determination circuitry 226. When the penetration determination circuitry 226 determines that there are more times of interest for which penetration data points are to be determined, the example instructions and/or example operations 500 return to block 502, and the process repeats for the second time of interest and/or another time of interest.

At block 510, when the penetration determination circuitry 226 determines that there are no more times of interest, the computing device 116 determines the penetration data based on a combination of penetration data points. For example, the penetration determination circuitry 226 aggregates, combines, accumulates, and/or gathers the penetration data points to generate the penetration data. The penetration data can be a representation (e.g., a chart, graph, spreadsheet, etc.) of the penetration data points to show a trend of penetration of the streaming service over time. After block 510, the example instructions and/or example operations 500 return to block 314 of FIG. 3.

Figure 6:
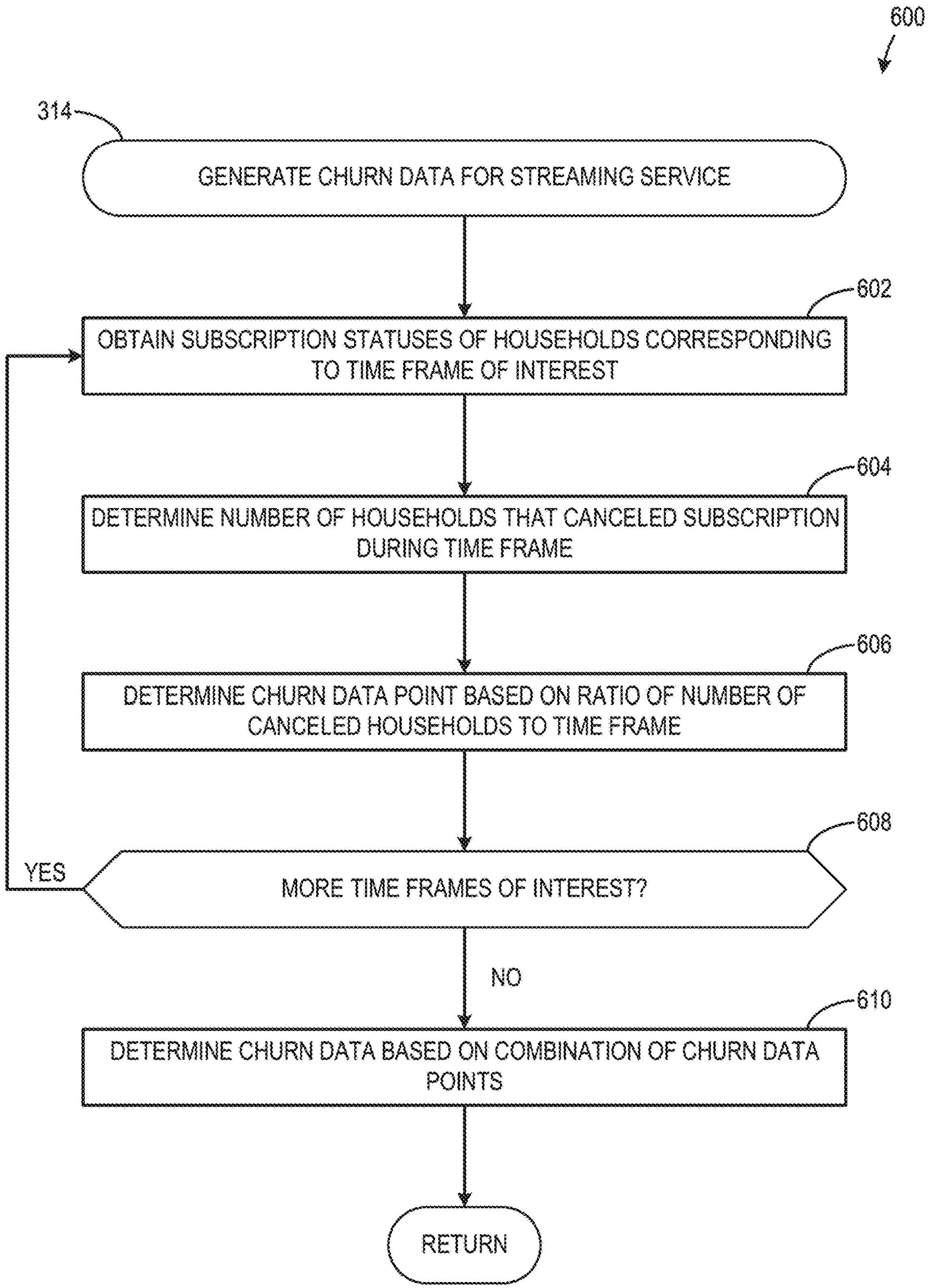

FIG. 6 is a flowchart representative of example machine readable instructions and/or example operations 600 that may be executed and/or instantiated by processor circuitry to implement the churn determination circuitry 228 of the computing device 116 to determine churn data the first streaming service. The machine readable instructions and/or the operations 600 of FIG. 6 begin at block 602, at which the computing device 116 obtains subscription statuses of households corresponding to a first time frame of interest. For example, the churn determination circuitry 228 can search the storage device(s) 204 (e.g., the non-volatile memory 208) for the subscription statuses corresponding to the streaming service and the first time frame of interest. The churn determination circuitry 228 can store the corresponding subscription statuses in a storage location (e.g., in the volatile memory 206) different than the location in which a bulk of subscription statuses are stored.

At block 604, the computing device 116 determines a number of households that canceled subscriptions to the first streaming service during the first time frame of interest. For example, the churn determination circuitry 228 can increment a counter of the number of households with subscription statuses that transitioned from a subscribed characterization to an unsubscribed characterization during the first time frame of interest.

At block 606, the computing device 116 determines a first churn data point corresponding to the first streaming service and the first time frame of interest. For example, the churn determination circuitry 228 determines the first churn data point based on a ratio of the number of canceled households to the time frame of interest.

At block 608, the computing device 116 determines whether there are more time frames of interest for which churn data points are to be determined. For example, the penetration determination circuitry 226 determines whether there is a second time frame of interest based on the example instructions and/or example operations 600, such as based on whether another subsequent time frame of the same length is within a time period being examined by the churn determination circuitry 228. When the churn determination circuitry 228 determines that there are more time frames of interest for which churn data points are to be determined, the example instructions and/or example operations 600 return to block 602, and the process repeats for the second time frame of interest and/or another time frame of interest.

At block 610, when the churn determination circuitry 228 determines that there are no more time frames of interest, the computing device 116 determines the churn data based on a combination of churn data points. For example, the churn determination circuitry 228 aggregates, combines, and/or gathers the churn data points to generate the churn data. The churn data can be a representation (e.g., a chart, graph, spreadsheet, etc.) of the churn data points to show a trend of churn of the streaming service over time. After block 610, the example instructions and/or example operations 600 return to block 316 of FIG. 3.

Figure 7:
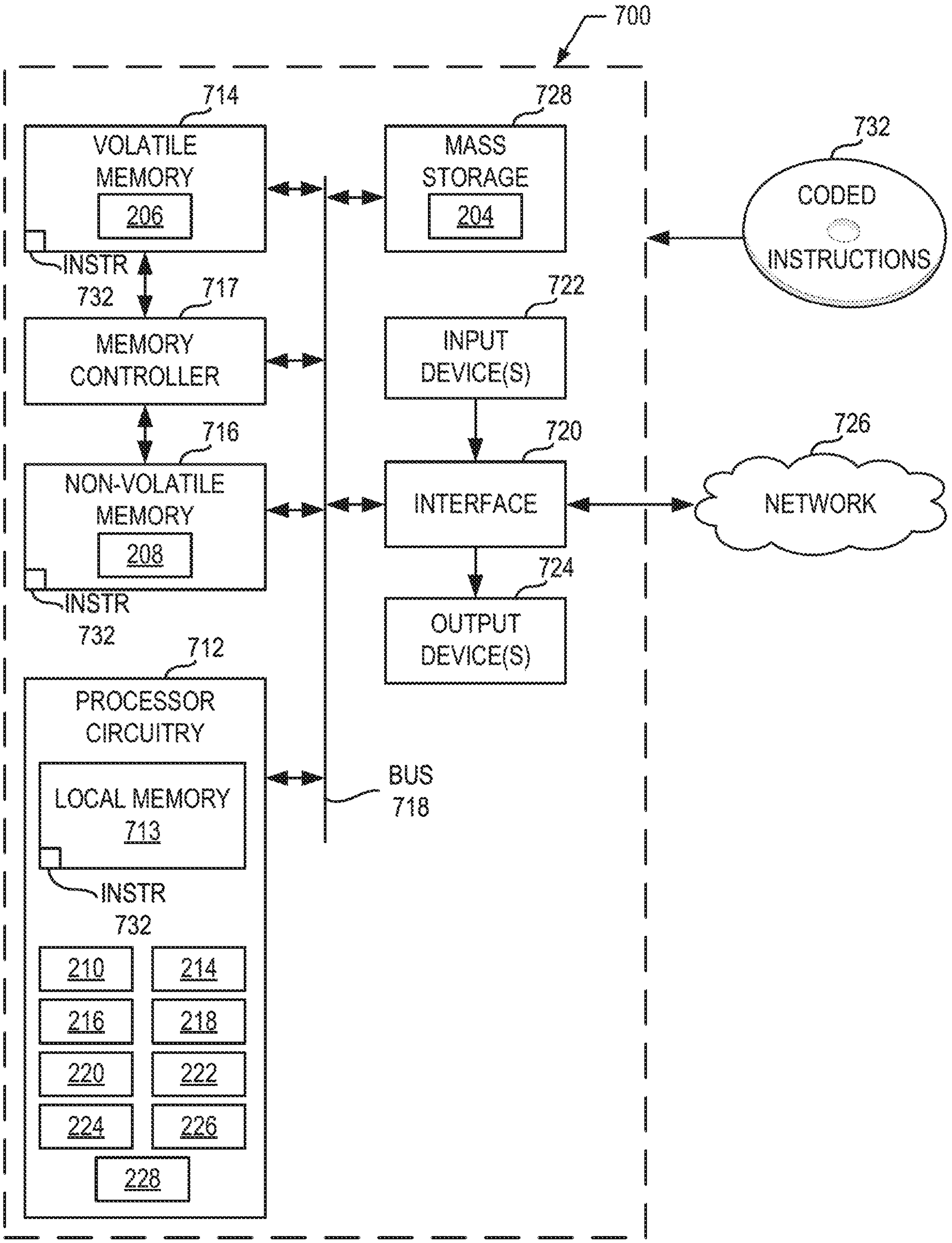
FIG. 7 is a block diagram of an example processing platform including processor circuitry structured to execute the example machine readable instructions and/or the example operations of FIGS. 3-6 to implement the computing device of FIG. 2.

FIG. 7 is a block diagram of an example processor platform 700 structured to execute and/or instantiate the machine readable instructions and/or the operations of FIGS. 3-6 to implement the computing device 116 of FIG. 2. The processor platform 700 can be, for example, a server, a personal computer, a workstation, a self-learning machine (e.g., a neural network), or any other type of computing device.

The processor platform 700 of the illustrated example includes processor circuitry 712. The processor circuitry 712 of the illustrated example is hardware. For example, the processor circuitry 712 can be implemented by one or more integrated circuits, logic circuits, FPGAs, microprocessors, CPUs, GPUs, DSPs, and/or microcontrollers from any desired family or manufacturer. The processor circuitry 712 may be implemented by one or more semiconductor based (e.g., silicon based) devices. In this example, the processor circuitry 712 implements the example communication controller circuitry 216, the example aggregation circuitry 218, the example tuning event recognition circuitry 220, the example interval determination circuitry 222, the example characterization circuitry 224, the example penetration determination circuitry 226, the example churn determination circuitry 228, and/or. more generally, the computing device 116 of FIG. 2.

The processor circuitry 712 of the illustrated example includes a local memory 713 (e.g., a cache, registers, etc.). The processor circuitry 712 of the illustrated example is in communication with a main memory including a volatile memory 714 and a non-volatile memory 716 by a bus 718. The volatile memory 714 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 716 may be implemented by flash memory and/or any other desired type of memory device. Access to the main memory 714, 716 of the illustrated example is controlled by a memory controller 717.

The processor platform 700 of the illustrated example also includes interface circuitry 720. The interface circuitry 720 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 722 are connected to the interface circuitry 720. The input device(s) 722 permit(s) a user to enter data and/or commands into the processor circuitry 712. The input device(s) 722 can be implemented by, for example, an audio sensor, a microphone, a camera (still or video), a keyboard, a button, a mouse, a touchscreen, a track-pad, a trackball, an isopoint device, and/or a voice recognition system.

One or more output devices 724 are also connected to the interface circuitry 720 of the illustrated example. The output device(s) 724 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 720 of the illustrated example, thus, typically includes a graphics driver card, a graphics driver chip, and/or graphics processor circuitry such as a GPU.

The interface circuitry 720 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 726. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 700 of the illustrated example also includes one or more mass storage devices 728 to store software and/or data. Examples of such mass storage devices 728 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 432, which may be implemented by the machine readable instructions of FIGS. 3-6, may be stored in the mass storage device 728, in the volatile memory 714, in the non-volatile memory 716, and/or on a removable non-transitory computer readable storage medium such as a CD or DVD.

Figure 8:
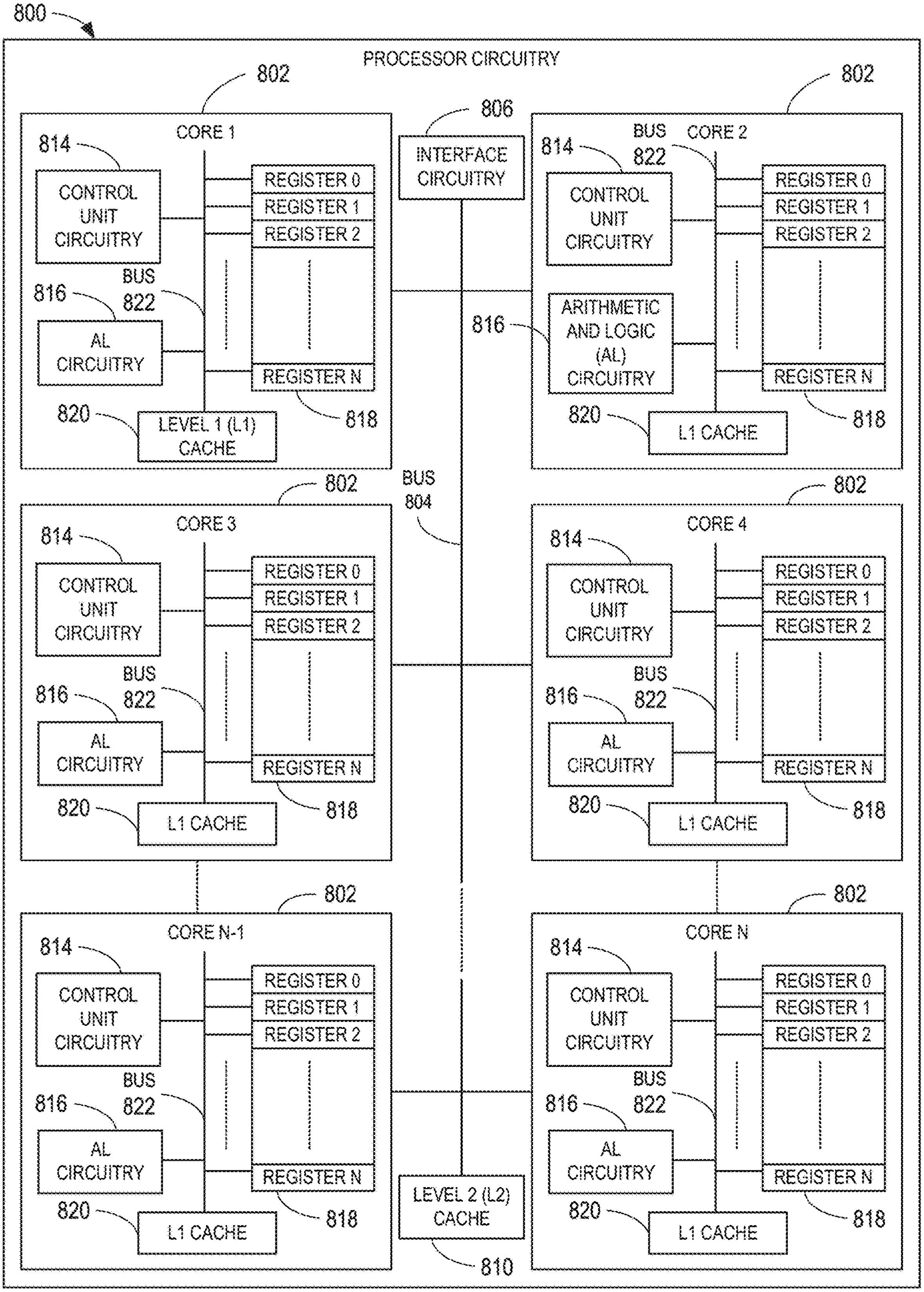
FIG. 8 is a block diagram of an example implementation of the processor circuitry of FIG. 7.

FIG. 8 is a block diagram of an example implementation of the processor circuitry 712 of FIG. 7. In this example, the processor circuitry 712 of FIG. 7 is implemented by a microprocessor 800. For example, the microprocessor 800 may be a general purpose microprocessor (e.g., general purpose microprocessor circuitry). The microprocessor 800 executes some or all of the machine readable instructions of the flowcharts of FIGS. 3-6 to effectively instantiate the circuitry of FIG. 2 as logic circuits to perform the operations corresponding to those machine readable instructions. In some such examples, the circuitry of FIG. 2 is instantiated by the hardware circuits of the microprocessor 800 in combination with the instructions. For example, the microprocessor 800 may be implemented by multi-core hardware circuitry such as a CPU, a DSP, a GPU, an XPU, etc. Although it may include any number of example cores 802 (e.g., 1 core), the microprocessor 800 of this example is a multi-core semiconductor device including N cores. The cores 802 of the microprocessor 800 may operate independently or may cooperate to execute machine readable instructions. For example, machine code corresponding to a firmware program, an embedded software program, or a software program may be executed by one of the cores 802 or may be executed by multiple ones of the cores 802 at the same or different times. In some examples, the machine code corresponding to the firmware program, the embedded software program, or the software program is split into threads and executed in parallel by two or more of the cores 802. The software program may correspond to a portion or all of the machine readable instructions and/or operations represented by the flowcharts of FIGS. 3-6.

The cores 802 may communicate by a first example bus 804. In some examples, the first bus 804 may be implemented by a communication bus to effectuate communication associated with one(s) of the cores 802. For example, the first bus 804 may be implemented by at least one of an Inter-Integrated Circuit (I2C) bus, a Serial Peripheral Interface (SPI) bus, a PCI bus, or a PCIe bus. Additionally or alternatively, the first bus 804 may be implemented by any other type of computing or electrical bus. The cores 802 may obtain data, instructions, and/or signals from one or more external devices by example interface circuitry 806. The cores 802 may output data, instructions, and/or signals to the one or more external devices by the interface circuitry 806. Although the cores 802 of this example include example local memory 820 (e.g., Level 1 (L1) cache that may be split into an L1 data cache and an L1 instruction cache), the microprocessor 800 also includes example shared memory 810 that may be shared by the cores (e.g., Level 2 (L2 cache)) for high-speed access to data and/or instructions. Data and/or instructions may be transferred (e.g., shared) by writing to and/or reading from the shared memory 810. The local memory 820 of each of the cores 802 and the shared memory 810 may be part of a hierarchy of storage devices including multiple levels of cache memory and the main memory (e.g., the main memory 714, 716 of FIG. 7). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 802 may be referred to as a CPU, DSP, GPU, etc., or any other type of hardware circuitry. Each core 802 includes control unit circuitry 814, arithmetic and logic (AL)

circuitry (sometimes referred to as an ALU) 816, a plurality of registers 818, the local memory 820, and a second example bus 822. Other structures may be present. For example, each core 802 may include vector unit circuitry, single instruction multiple data (SIMD) unit circuitry, load/store unit (LSU) circuitry, branch/jump unit circuitry, floating-point unit (FPU) circuitry, etc. The control unit circuitry 814 includes semiconductor-based circuits structured to control (e.g., coordinate) data movement within the corresponding core 802. The AL circuitry 816 includes semiconductor-based circuits structured to perform one or more mathematic and/or logic operations on the data within the corresponding core 802. The AL circuitry 816 of some examples performs integer based operations. In other examples, the AL circuitry 816 also performs floating point operations. In yet other examples, the AL circuitry 816 may include first AL circuitry that performs integer based operations and second AL circuitry that performs floating point operations. In some examples, the AL circuitry 816 may be referred to as an Arithmetic Logic Unit (ALU). The registers 818 are semiconductor-based structures to store data and/or instructions such as results of one or more of the operations performed by the AL circuitry 816 of the corresponding core 802. For example, the registers 818 may include vector register(s), SIMD register(s), general purpose register(s), flag register(s), segment register(s), machine specific register(s), instruction pointer register(s), control register(s), debug register(s), memory management register(s), machine check register(s), etc. The registers 818 may be arranged in a bank as shown in FIG. 8. Alternatively, the registers 818 may be organized in any other arrangement, format, or structure including distributed throughout the core 802 to shorten access time. The second bus 822 may be implemented by at least one of an I2C bus, a SPI bus, a PCI bus, or a PCIe bus Each core 802 and/or, more generally, the microprocessor 800 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 800 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 9:
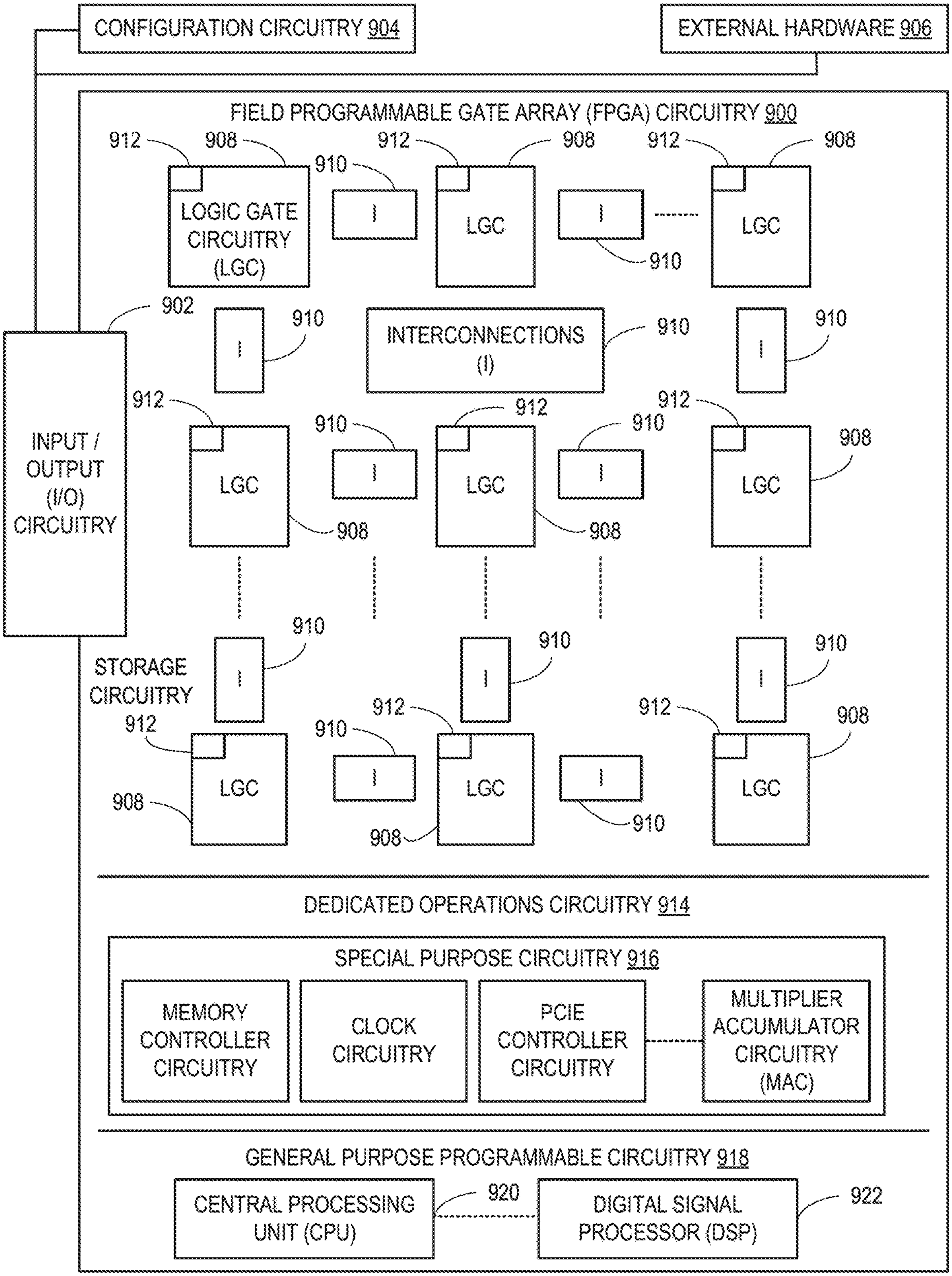
FIG. 9 is a block diagram of another example implementation of the processor circuitry of FIG. 7.

FIG. 9 is a block diagram of another example implementation of the processor circuitry 712 of FIG. 7. In this example, the processor circuitry 712 is implemented by FPGA circuitry 900. For example, the FPGA circuitry 900 may be implemented by an FPGA. The FPGA circuitry 900 can be used, for example, to perform operations that could otherwise be performed by the example microprocessor 800 of FIG. 8 executing corresponding machine readable instructions. However, once configured, the FPGA circuitry 900 instantiates the machine readable instructions in hardware and, thus, can often execute the operations faster than they could be performed by a general purpose microprocessor executing the corresponding software.

More specifically, in contrast to the microprocessor 800 of FIG. 8 described above (which is a general purpose device that may be programmed to execute some or all of the machine readable instructions represented by the flowcharts of FIGS. 3-6 but whose interconnections and logic circuitry are fixed once fabricated), the FPGA circuitry 900 of the example of FIG. 9 includes interconnections and logic circuitry that may be configured and/or interconnected in different ways after fabrication to instantiate, for example, some or all of the machine readable instructions represented by the flowcharts of FIGS. 3-6. In particular, the FPGA circuitry 900 may be thought of as an array of logic gates, interconnections, and switches. The switches can be programmed to change how the logic gates are interconnected by the interconnections, effectively forming one or more dedicated logic circuits (unless and until the FPGA circuitry 900 is reprogrammed). The configured logic circuits enable the logic gates to cooperate in different ways to perform different operations on data received by input circuitry. Those operations may correspond to some or all of the software represented by the flowcharts of FIGS. 3-6. As such, the FPGA circuitry 900 may be structured to effectively instantiate some or all of the machine readable instructions of the flowcharts of FIGS. 3-6 as dedicated logic circuits to perform the operations corresponding to those software instructions in a dedicated manner analogous to an ASIC. Therefore, the FPGA circuitry 900 may perform the operations corresponding to the some or all of the machine readable instructions of FIGS. 3-6 faster than the general purpose microprocessor can execute the same.

In the example of FIG. 9, the FPGA circuitry 900 is structured to be programmed (and/or reprogrammed one or more times) by an end user by a hardware description language (HDL) such as Verilog. The FPGA circuitry 900 of FIG. 9, includes example input/output (I/O) circuitry 902 to obtain and/or output data to/from example configuration circuitry 904 and/or external hardware 906. For example, the configuration circuitry 904 may be implemented by interface circuitry that may obtain machine readable instructions to configure the FPGA circuitry 900, or portion(s) thereof. In some such examples, the configuration circuitry 904 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 906 may be implemented by external hardware circuitry. For example, the external hardware 906 may be implemented by the microprocessor 800 of FIG. 8. The FPGA circuitry 900 also includes an array of example logic gate circuitry 908, a plurality of example configurable interconnections 910, and example storage circuitry 912. The logic gate circuitry 908 and the configurable interconnections 910 are configurable to instantiate one or more operations that may correspond to at least some of the machine readable instructions of FIGS. 3-6 and/or other desired operations. The logic gate circuitry 908 shown in FIG. 9 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 908 to enable configuration of the electrical structures and/or the logic gates to form circuits to perform desired operations. The logic gate circuitry 908 may include other electrical structures such as look-up tables (LUTs), registers (e.g., flip-flops or latches), multiplexers, etc.

The configurable interconnections 910 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 908 to program desired logic circuits.

The storage circuitry 912 of the illustrated example is structured to store result(s) of the one or more of the operations performed by corresponding logic gates. The storage circuitry 912 may be implemented by registers or the like. In the illustrated example, the storage circuitry 912 is distributed amongst the logic gate circuitry 908 to facilitate access and increase execution speed.

The example FPGA circuitry 900 of FIG. 9 also includes example Dedicated Operations Circuitry 914. In this example, the Dedicated Operations Circuitry 914 includes special purpose circuitry 916 that may be invoked to implement commonly used functions to avoid the need to program those functions in the field. Examples of such special purpose circuitry 916 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 900 may also include example general purpose programmable circuitry 918 such as an example CPU 920 and/or an example DSP 922. Other general purpose programmable circuitry 918 may additionally or alternatively be present such as a GPU, an XPU, etc., that can be programmed to perform other operations.

Although FIGS. 8 and 9 illustrate two example implementations of the processor circuitry 712 of FIG. 7, many other approaches are contemplated. For example, as mentioned above, modern FPGA circuitry may include an on-board CPU, such as one or more of the example CPU 920 of FIG. 9. Therefore, the processor circuitry 712 of FIG. 7 may additionally be implemented by combining the example microprocessor 800 of FIG. 8 and the example FPGA circuitry 900 of FIG. 9. In some such hybrid examples, a first portion of the machine readable instructions represented by the flowcharts of FIGS. 3-6 may be executed by one or more of the cores 802 of FIG. 8, a second portion of the machine readable instructions represented by the flowcharts of FIGS. 3-6 may be executed by the FPGA circuitry 900 of FIG. 9, and/or a third portion of the machine readable instructions represented by the flowcharts of FIGS. 3-6 may be executed by an ASIC. It should be understood that some or all of the circuitry of FIG. 2 may, thus, be instantiated at the same or different times. Some or all of the circuitry may be instantiated, for example, in one or more threads executing concurrently and/or in series. Moreover, in some examples, some or all of the circuitry of FIG. 2 may be implemented within one or more virtual machines and/or containers executing on the microprocessor.

In some examples, the processor circuitry 712 of FIG. 7 may be in one or more packages. For example, the microprocessor 800 of FIG. 8 and/or the FPGA circuitry 900 of FIG. 9 may be in one or more packages. In some examples, an XPU may be implemented by the processor circuitry 712 of FIG. 7, which may be in one or more packages. For example, the XPU may include a CPU in one package, a DSP in another package, a GPU in yet another package, and an FPGA in still yet another package.

Figure 10:
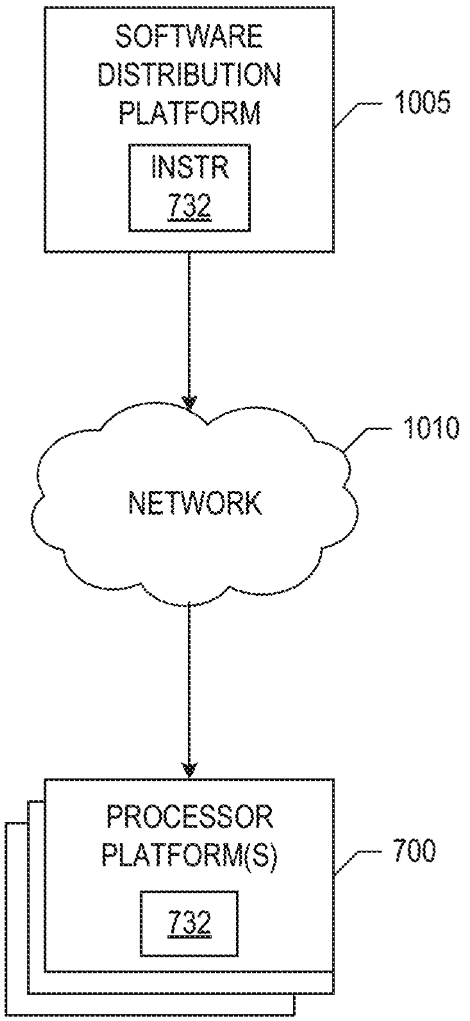
FIG. 10 is a block diagram of an example software distribution platform (e.g., one or more servers) to distribute software (e.g., software corresponding to the example machine readable instructions of FIGS. 3-6 to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1005 to distribute software such as the example machine readable instructions 732 of FIG. 7 to hardware devices owned and/or operated by third parties is illustrated in FIG. 10. The example software distribution platform 1005 may be implemented by any computer server, data facility, cloud service, etc., capable of storing and transmitting software to other computing devices. The third parties may be customers of the entity owning and/or operating the software distribution platform 1005. For example, the entity that owns and/or operates the software distribution platform 1005 may be a developer, a seller, and/or a licensor of software such as the example machine readable instructions 732 of FIG. 7. The third parties may be consumers, users, retailers, OEMs, etc., who purchase and/or license the software for use and/or re-sale and/or sub-licensing. In the illustrated example, the software distribution platform 1005 includes one or more servers and one or more storage devices. The storage devices store the machine readable instructions 732, which may correspond to the example machine readable instructions 300-600 of FIGS. 3-6, as described above. The one or more servers of the example software distribution platform 1005 are in communication with an example network 1010, which may correspond to any one or more of the Internet and/or any of the example networks 108 or 726 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 732 from the software distribution platform 1005. For example, the software, which may correspond to the example machine readable instructions 732 of FIG. 7, may be downloaded to the example processor platform 700, which is to execute the machine readable instructions 732 to implement the computing device 116 of FIGS. 1 and/or 2. In some examples, one or more servers of the software distribution platform 1005 periodically offer, transmit, and/or force updates to the software (e.g., the example machine readable instructions 732 of FIG. 7) to ensure improvements, patches, updates, etc., are distributed and applied to the software at the end user devices.

From the foregoing, it will be appreciated that example systems, methods, apparatus, and articles of manufacture have been disclosed that determine penetration and churn of streaming services during a time period based on characterized subscription statuses (e.g., subscribed statuses and/or unsubscribed statuses) of households. Disclosed systems, methods, apparatus, and articles of manufacture improve the efficiency of using a computing device by determining subscription statuses of the households based on a probability of subscription rather than a less timely and/or low-yielding technique (e.g., surveys, user inputs to a meter, automated content recognition, etc.). In other words, subscription statuses can be characterized based on time intervals between usage of the streaming services and likelihoods of cancellations, wherein the likelihoods are based on whether the time intervals satisfy retention threshold(s). Disclosed systems, methods, apparatus, and articles of manufacture are accordingly directed to one or more improvement(s) in the operation of a machine such as a computer or other electronic and/or mechanical device.

Example methods, apparatus, systems, and articles of manufacture to determine penetration and churn of streaming services are disclosed herein. Further examples and combinations thereof include the following:

Example 1 includes an apparatus to determine a penetration of a streaming service and a churn of the streaming service comprising interface circuitry to obtain a first tuning event and a second tuning event, and processor circuitry including one or more of at least one of a central processor unit, a graphics processor unit, or a digital signal processor, the at least one of the central processor unit, the graphics processor unit, or the digital signal processor having control circuitry to control data movement within the processor circuitry, arithmetic and logic circuitry to perform one or more first operations corresponding to instructions, and one or more registers to store a result of the one or more first operations, the instructions in the apparatus, a Field Programmable Gate Array (FPGA), the FPGA including logic gate circuitry, a plurality of configurable interconnections, and storage circuitry, the logic gate circuitry and the plurality of the configurable interconnections to perform one or more second operations, the storage circuitry to store a result of the one or more second operations, or Application Specific Integrated Circuitry (ASIC) including logic gate circuitry to perform one or more third operations, the processor circuitry to perform at least one of the first operations, the second operations, or the third operations to instantiate interval determination circuitry to determine an interval between the first tuning event and the second tuning event, the first and second tuning events corresponding to streaming of media in a first household using the streaming service via a media device, characterization circuitry to characterize a status of the first household as subscribed when the interval satisfies a threshold, aggregation circuitry to aggregate statuses of households over a time period, the households including the first household, and penetration determination circuitry to generate first analytical data based on a number of subscribed statuses per a total number of households at a timestamp, the timestamp within the time period.

Example 2 includes the apparatus of example 1, further including churn determination circuitry to generate second analytical data based on a number of canceled subscriptions per a time frame, the time frame within the time period, the number of canceled subscriptions corresponding to a number of households with at least one subscribed status and at least one unsubscribed status during the time frame.

Example 3 includes the apparatus of example 2, wherein the first analytical data corresponds to the penetration of the streaming service, and the second analytical data corresponds to the churn of the streaming service.

Example 4 includes the apparatus of example 1, wherein the penetration determination circuitry is to determine penetration data points and combine the penetration data points to represent the penetration of the streaming service.

Example 5 includes the apparatus of example 4, wherein the penetration determination circuitry is to determine the penetration data points based on a ratio of the number of subscribed statuses at a time indicated by the timestamp to the total number of households.

Example 6 includes the apparatus of example 2, wherein the churn determination circuitry is to determine churn data points and combine the churn data points to represent the churn of the streaming service.

Example 7 includes the apparatus of example 6, wherein the churn determination circuitry is to determine the churn data points based on a ratio of the number of canceled subscriptions to the time frame.

Example 8 includes the apparatus of example 1, further including tuning event generation circuitry to generate the first tuning event and the second tuning event based on tuning data collected from a streaming meter in the first household, the streaming meter to measure network traffic corresponding to the media device and the streaming service.

Example 9 includes the apparatus of example 1, wherein the first tuning event includes a first start timestamp, a first end timestamp, a uniform resource locator of the streaming service, and a media device identifier, and wherein the second tuning event includes a second start timestamp, a second end timestamp, the uniform resource locator of the streaming service, and the media device identifier.

Example 10 includes the apparatus of example 9, wherein the interval is a length of time between the first end timestamp and the second start timestamp.

Example 11 includes an apparatus to determine a penetration of a streaming service and a churn of the streaming service comprising at least one memory, machine readable instructions, and processor circuitry to at least one of instantiate or execute the machine readable instructions to calculate an interval between a first tuning event and a second tuning event, the first and second tuning events corresponding to streaming of media in a first household using the streaming service via a media device, label a status of the first household as subscribed when the interval satisfies a threshold, combine statuses of households over a time period, the households including the first household, and determine first analytical data based on a number of subscribed statuses per a total number of households at a timestamp, the timestamp within the time period.

Example 12 includes the apparatus of example 11, wherein the processor circuitry is to determine second analytical data based on a number of canceled subscriptions per a time frame, the time frame within the time period, the number of canceled subscriptions corresponding to a number of households with at least one subscribed status and at least one unsubscribed status during the time frame.

Example 13 includes the apparatus of example 12, wherein the first analytical data corresponds to the penetration of the streaming service, and the second analytical data corresponds to the churn of the streaming service.

Example 14 includes the apparatus of example 11, wherein the processor circuitry is to compute penetration data points and combine the penetration data points to represent the penetration of the streaming service.

Example 15 includes the apparatus of example 14, wherein, to compute the penetration data points, the processor circuitry is to divide the number of subscribed statuses at a time indicated by the timestamp by the total number of households.

Example 16 includes the apparatus of example 12, wherein the processor circuitry is to compute churn data points and combine the churn data points to represent the churn of the streaming service.

Example 17 includes the apparatus of example 16, wherein, to compute the churn data points, the processor circuitry is to divide the number of canceled subscriptions by the time frame.

Example 18 includes the apparatus of example 11, wherein the processor circuitry is to create the first tuning event and the second tuning event based on tuning data collected from a streaming meter in the first household, the streaming meter to measure network traffic corresponding to the media device and the streaming service.

Example 19 includes the apparatus of example 11, wherein the first tuning event includes a first start timestamp, a first end timestamp, a uniform resource locator of the streaming service, and a media device identifier, and wherein the second tuning event includes a second start timestamp, a second end timestamp, the uniform resource locator of the streaming service, and the media device identifier.

Example 20 includes the apparatus of example 19, wherein the interval is a length of time between the first end timestamp and the second start timestamp.

Example 21 includes a non-transitory machine readable storage medium comprising instructions that, when executed, cause processor circuitry to at least compute an interval between a first tuning event and a second tuning event, the first and second tuning events corresponding to streaming of media in a first household using a streaming service via a media device, indicate a status of the first household as subscribed when the interval satisfies a threshold, gather statuses of households over a time period, the households including the first household, and calculate first analytical data based on a number of subscribed statuses per a total number of households at a timestamp, the timestamp within the time period.

Example 22 includes the non-transitory machine readable storage medium of example 21, wherein the instructions are to cause the processor circuitry to calculate second analytical data based on a number of canceled subscriptions per a time frame, the time frame within the time period, the number of canceled subscriptions corresponding to a number of households with at least one subscribed status and at least one unsubscribed status during the time frame.

Example 23 includes the non-transitory machine readable storage medium of example 22, wherein the first analytical data corresponds to a penetration of the streaming service, and the second analytical data corresponds to a churn of the streaming service.

Example 24 includes the non-transitory machine readable storage medium of example 23, wherein the instructions are to cause the processor circuitry to generate penetration data points and combine the penetration data points to represent the penetration of the streaming service.

Example 25 includes the non-transitory machine readable storage medium of example 24, wherein the instructions are to cause the processor circuitry to generate the penetration data points based on a ratio of the number of subscribed statuses at a time indicated by the timestamp to the total number of households.

Example 26 includes the non-transitory machine readable storage medium of example 23, wherein the instructions are to cause the processor circuitry to generate churn data points and combine the churn data points to represent the churn of the streaming service.

Example 27 includes the non-transitory machine readable storage medium of example 26, wherein the instructions are to cause the processor circuitry to generate the churn data points based on a ratio of the number of canceled subscriptions to the time frame.

Example 28 includes the non-transitory machine readable storage medium of example 21, wherein the instructions are to cause the processor circuitry to produce the first tuning event and the second tuning event based on tuning data collected from a streaming meter in the first household, the streaming meter to measure network traffic corresponding to the media device and the streaming service.

Example 29 includes the non-transitory machine readable storage medium of example 21, wherein the first tuning event includes a first start timestamp, a first end timestamp, a uniform resource locator of the streaming service, and a media device identifier, and wherein the second tuning event includes a second start timestamp, a second end timestamp, the uniform resource locator of the streaming service, and the media device identifier.

Example 30 includes the non-transitory machine readable storage medium of example 29, wherein the interval is a length of time between the first end timestamp and the second start timestamp.

Example 31 includes a non-transitory machine readable medium comprising interval determination instructions to cause at least one machine to process an interval between a first tuning event and a second tuning event, the first and second tuning events corresponding to streaming of media in a first household using a streaming service via a media device, characterization instructions to cause the at least one machine to assign a status of the first household as subscribed when the interval satisfies a threshold, aggregation instructions to cause the at least one machine to accumulate statuses of households over a time period, the households including the first household, and penetration determination instructions to cause the at least one machine to compute first analytical data based on a number of subscribed statuses per a total number of households at a timestamp, the timestamp within the time period.

Example 32 includes the non-transitory machine readable medium of example 31, further including churn determination instructions to cause the at least one machine to compute second analytical data based on a number of canceled subscriptions per a time frame, the time frame within the time period, the number of canceled subscriptions corresponding to a number of households with at least one subscribed status and at least one unsubscribed status during the time frame.

Example 33 includes the non-transitory machine readable medium of example 32, wherein the first analytical data corresponds to a penetration of the streaming service, and the second analytical data corresponds to a churn of the streaming service.

Example 34 includes the non-transitory machine readable medium of example 33, wherein the penetration determination instructions are to cause the at least one machine to determine penetration data points and combine the penetration data points to represent the penetration of the streaming service.

Example 35 includes the non-transitory machine readable medium of example 34, wherein the penetration determination instructions are to cause the at least one machine to determine the penetration data points based on a ratio of the number of subscribed statuses at a time indicated by the timestamp to the total number of households.

Example 36 includes the non-transitory machine readable medium of example 33, wherein the churn determination instructions are to cause the at least one machine to determine churn data points and combine the churn data points to represent the churn of the streaming service.

Example 37 includes the non-transitory machine readable medium of example 36, wherein the churn determination instructions are to cause the at least one machine to determine the churn data points based on a ratio of the number of canceled subscriptions to the time frame.

Example 38 includes the non-transitory machine readable medium of example 31, further including tuning event generation instructions to cause the at least one machine to generate the first tuning event and the second tuning event based on tuning data collected from a streaming meter in the first household, the streaming meter to measure network traffic corresponding to the media device and the streaming service.

Example 39 includes the non-transitory machine readable medium of example 31, wherein the first tuning event includes a first start timestamp, a first end timestamp, a uniform resource locator of the streaming service, and a media device identifier, and wherein the second tuning event includes a second start timestamp, a second end timestamp, the uniform resource locator of the streaming service, and the media device identifier.

Example 40 includes the non-transitory machine readable medium of example 39, wherein the interval is a length of time between the first end timestamp and the second start timestamp.

Example 41 includes a method comprising determining an interval between a first tuning event and a second tuning event, the first and second tuning events corresponding to streaming of media in a first household using a streaming service via a media device, characterizing a status of the first household as subscribed when the interval satisfies a threshold, aggregating statuses of households over a time period, the households including the first household, and generating first analytical data based on a number of subscribed statuses per a total number of households at a timestamp, the timestamp within the time period.

Example 42 includes the method of example 41, further including generating second analytical data based on a number of canceled subscriptions per a time frame, the time frame within the time period, the number of canceled subscriptions corresponding to a number of households with at least one subscribed status and at least one unsubscribed status during the time frame.

Example 43 includes the method of example 42, wherein the first analytical data corresponds to a penetration of the streaming service, and the second analytical data corresponds to a churn of the streaming service.

Example 44 includes the method of example 43, wherein the generating of the first analytical data includes determining penetration data points and combining the penetration data points to represent the penetration of the streaming service.

Example 45 includes the method of example 44, wherein the determining of the penetration data points includes calculating a ratio of the number of subscribed statuses at a time indicated by the timestamp to the total number of households.

Example 46 includes the method of example 43, wherein the generating of the second analytical data includes determining churn data points and combining the churn data points to represent the churn of the streaming service.

Example 47 includes the method of example 46, wherein the determining of the churn data points includes calculating a ratio of the number of canceled subscriptions to the time frame.

Example 48 includes the method of example 41, further including generating the first tuning event and the second tuning event based on tuning data collected from a streaming meter in the first household, the streaming meter to measure network traffic corresponding to the media device and the streaming service.

Example 49 includes the method of example 41, wherein the first tuning event includes a first start timestamp, a first end timestamp, a uniform resource locator of the streaming service, and a media device identifier, and wherein the second tuning event includes a second start timestamp, a second end timestamp, the uniform resource locator of the streaming service, and the media device identifier.

Example 50 includes the method of example 49, wherein the interval is a length of time between the first end timestamp and the second start timestamp.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An audience measurement system comprising:
- a processor; and
- at least one memory having stored thereon computer readable instructions that, when executed by the processor, cause the audience measurement system to perform operations, the operations comprising:
  - detecting a first tuning event based on network traffic monitored by a streaming meter associated with a first household, wherein the first tuning event corresponds to streaming of media in the first household on a media device using a given streaming service and includes a timestamp;
  - calculating, using the timestamp, an interval between the first tuning event and a subsequent point in time;
  - updating a status of the first household based on the interval and a retention threshold; and
  - determining a streaming subscription share measure corresponding to the given streaming service by combining statuses of multiple households over a time period, wherein the multiple households include the first household.

2. The audience measurement system of claim 1, wherein the updating comprises:
- updating the status of the first household as subscribed to the given streaming service in response to determining that the interval satisfies the retention threshold; or
- updating the status of the first household as unsubscribed to the given streaming service in response to determining that the interval does not satisfy the retention threshold.

3. The audience measurement system of claim 1, wherein the streaming subscription share measure comprises a penetration measure, wherein the penetration measure is determined based on a number of subscribed statuses per a total number of the multiple households at a second timestamp, wherein the time period includes the second timestamp.

4. The audience measurement system of claim 1, wherein the streaming subscription share measure comprises a churn measure, wherein the churn measure is determined based on a number of canceled subscriptions per a time frame, wherein the time period includes the time frame, and wherein the number of canceled subscriptions corresponds to a number of the multiple households with at least one subscribed status and at least one unsubscribed status during the time frame.

5. A method comprising:
- detecting a first tuning event based on network traffic monitored by a streaming meter associated with a first household, wherein the first tuning event corresponds to streaming of media in the first household on a media device using a given streaming service and includes a timestamp;
- calculating, using the timestamp, an interval between the first tuning event and a subsequent point in time;

updating a status of the first household based on the interval and a retention threshold; and determining a streaming subscription share measure corresponding to the given streaming service by combining statuses of multiple households over a time period, wherein the multiple households include the first household.

6. The method of claim 5, wherein the updating comprises:

updating the status of the first household as subscribed to the given streaming service in response to determining that the interval satisfies the retention threshold; or updating the status of the first household as unsubscribed to the given streaming service in response to determining that the interval does not satisfy the retention threshold.

7. The method of claim 5, wherein the streaming subscription share measure comprises a penetration measure, wherein the penetration measure is determined based on a number of subscribed statuses per a total number of the multiple households at a second timestamp, wherein the time period includes the second timestamp.

8. The method of claim 5, wherein the streaming subscription share measure comprises a churn measure, wherein the churn measure is determined based on a number of canceled subscriptions per a time frame, wherein the time period includes the time frame, and wherein the number of canceled subscriptions corresponds to a number of the multiple households with at least one subscribed status and at least one unsubscribed status during the time frame.

9. A non-transitory computer readable storage medium having stored thereon instructions that, when executed by a processor, cause performance of:

detecting a first tuning event based on network traffic monitored by a streaming meter associated with a first household, wherein the first tuning event corresponds to streaming of media in the first household on a media device using a given streaming service and includes a timestamp;

calculating, using the timestamp, an interval between the first tuning event and a subsequent point in time;

updating a status of the first household based on the interval and a retention threshold; and determining a streaming subscription share measure corresponding to the given streaming service by combining statuses of multiple households over a time period, wherein the multiple households include the first household.

10. The non-transitory computer readable storage medium of claim 9, wherein the updating comprises:

updating the status of the first household as subscribed to the given streaming service in response to determining that the interval satisfies the retention threshold; or updating the status of the first household as unsubscribed to the given streaming service in response to determining that the interval does not satisfy the retention threshold.

11. The non-transitory computer readable storage medium of claim 9, wherein the streaming subscription share measure comprises a penetration measure, wherein the penetration measure is determined based on a number of subscribed statuses per a total number of the multiple households at a second timestamp, wherein the time period includes the second timestamp.

12. The non-transitory computer readable storage medium of claim 9, wherein the streaming subscription share measure comprises a churn measure, wherein the churn measure is determined based on a number of canceled subscriptions per a time frame, wherein the time period includes the time frame, and wherein the number of canceled subscriptions corresponds to a number of the multiple households with at least one subscribed status and at least one unsubscribed status during the time frame.

13. The audience measurement system of claim 1, wherein the subsequent point in time corresponds to a second tuning event or an end of the time period.

14. The audience measurement system of claim 1, wherein the operations further include transmitting the streaming subscription share measure via a network for at least one of media exposure analysis, audience behavior analysis, or predictive subscription analysis.

15. The audience measurement system of claim 1, wherein the streaming meter intercepts wireless signals sent from a router to the media device to monitor the network traffic.

16. The audience measurement system of claim 1, wherein the retention threshold is based on a likelihood of the first household being subscribed to the given streaming service during a period of inactivity.

17. The method of claim 5, wherein the subsequent point in time corresponds to a second tuning event or an end of the time period.

18. The method of claim 5, further including transmitting the streaming subscription share measure via a network for at least one of media exposure analysis, audience behavior analysis, or predictive subscription analysis.

19. The non-transitory computer readable storage medium of claim 9, wherein the subsequent point in time corresponds to a second tuning event or an end of the time period.

20. The non-transitory computer readable storage medium of claim 9, wherein the instructions further cause, when executed by the processor, performance of transmitting the streaming subscription share measure via a network for at least one of media exposure analysis, audience behavior analysis, or predictive subscription analysis.

* * * * *